(12) United States Patent
Chou et al.

(10) Patent No.: US 8,089,831 B2
(45) Date of Patent: Jan. 3, 2012

(54) HEAT-ASSISTED MAGNETIC RECORDING HEAD INCLUDING PLASMON GENERATOR

(75) Inventors: Tsutomu Chou, Tokyo (JP); Eiji Komura, Tokyo (JP); Koji Shimazawa, Tokyo (JP); Kosuke Tanaka, Tokyo (JP); Daisuke Miyauchi, Tokyo (JP)

(73) Assignee: TDK Corporation, Tokyo (JP)

( * ) Notice: Subject to any disclaimer, the term of this patent is extended or adjusted under 35 U.S.C. 154(b) by 152 days.

(21) Appl. No.: 12/710,129

(22) Filed: Feb. 22, 2010

(65) Prior Publication Data

US 2011/0205860 A1    Aug. 25, 2011

(51) Int. Cl.
*G11B 11/00* (2006.01)
(52) U.S. Cl. .................. 369/13.33; 369/112.27
(58) Field of Classification Search ......... 369/13.02, 369/13.03, 13.12, 13.13, 13.24, 13.32, 13.33, 369/112.27; 385/31, 129; 360/59, 245.3
See application file for complete search history.

(56) References Cited

U.S. PATENT DOCUMENTS

| | | | |
|---|---|---|---|
| 7,221,826 B2 | 5/2007 | Hanashima et al. | |
| 7,454,095 B2 | 11/2008 | Baehr-Jones et al. | |
| 7,529,158 B2 | 5/2009 | Matsumoto et al. | |
| 7,821,732 B2 * | 10/2010 | Komura et al. | 360/59 |
| 7,911,882 B2 * | 3/2011 | Shimazawa et al. | 369/13.33 |
| 8,000,178 B2 * | 8/2011 | Shimazawa et al. | 369/13.33 |
| 2007/0139818 A1 | 6/2007 | Shimazawa et al. | |
| 2009/0168220 A1 | 7/2009 | Komura et al. | |
| 2011/0216634 A1 * | 9/2011 | Chou et al. | 369/13.24 |
| 2011/0228419 A1 | 9/2011 | Tanaka et al. | |
| 2011/0228420 A1 | 9/2011 | Hara et al. | |

FOREIGN PATENT DOCUMENTS

JP    A-2004-302241    10/2004

OTHER PUBLICATIONS

Miyauchi et al., U.S. Appl. No. 12/557,078, filed Sep. 10, 2009.
Sasaki et al., U.S. Appl. No. 12/585,150, filed Sep. 4, 2009.
Sep. 15, 2011 Office Action issued in U.S. Appl. No. 12/728,890.
Sep. 21, 2011 Office Action issued in U.S. Appl. No. 12/728,600.
Sep. 19, 2011 Office Action issued in U.S. Appl. No. 12/719,496.
U.S. Appl. No. 12/617,853, filed on Nov. 13, 2009 to Komura et al.
U.S. Appl. No. 12/385,447, filed on Apr. 8, 2009 to Sasaki et al.

* cited by examiner

*Primary Examiner* — Ali Neyzari
(74) *Attorney, Agent, or Firm* — Oliff & Berridge, PLC

(57) ABSTRACT

A plasmon generator has an outer surface including a surface plasmon exciting surface, and has a near-field light generating part located in a medium facing surface. The surface plasmon exciting surface is a flat surface that faces an evanescent light generating surface of a waveguide with a predetermined distance therebetween. The surface plasmon exciting surface includes a width changing portion. The width of the width changing portion in a direction parallel to the medium facing surface and the evanescent light generating surface decreases with decreasing distance to the medium facing surface. A magnetic pole is located at such a position that the plasmon generator is interposed between the magnetic pole and the waveguide. The outer surface of the plasmon generator includes a pole contact surface that is in contact with the magnetic pole.

11 Claims, 16 Drawing Sheets

HEAT-ASSISTED MAGNETIC RECORDING HEAD INCLUDING PLASMON GENERATOR

BACKGROUND OF THE INVENTION

1. Field of the Invention

The present invention relates to a heat-assisted magnetic recording head including a plasmon generator for use in heat-assisted magnetic recording where a magnetic recording medium is irradiated with near-field light to lower the coercivity of the magnetic recording medium for data writing.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) intended for reading and a write head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the foregoing problems, there has been proposed a technique so-called heat-assisted magnetic recording. This technique uses a magnetic recording medium having high coercivity. When writing data, a magnetic field and heat are simultaneously applied to the area of the magnetic recording medium where to write data, so that the area rises in temperature and drops in coercivity for data writing. Hereinafter, a magnetic head for use in heat-assisted magnetic recording will be referred to as a heat-assisted magnetic recording head.

In heat-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light.

However, the plasmon antenna which generates near-field light by direct irradiation with light is known to exhibit very low efficiency of transformation of the applied light into near-field light. The energy of the light applied to the plasmon antenna is mostly reflected off the surface of the plasmon antenna, or transformed into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbes the thermal energy.

Such a temperature increase makes the plasmon antenna expand in volume and protrude from a medium facing surface, which is the surface of the heat-assisted magnetic recording head to face the magnetic recording medium. This causes an end of the read head located in the medium facing surface to get farther from the magnetic recording medium, thereby causing the problem that a servo signal cannot be read during write operations.

There has been known a technique in which a dielectric and a metal are arranged to face each other with a predetermined gap therebetween, and surface plasmons are excited on the metal by utilizing evanescent light that results from the total reflection of the light propagated through the dielectric at the surface of the dielectric. As a related technique, U.S. Pat. No. 7,454,095 discloses a technique in which a metal waveguide and a dielectric waveguide are arranged to face each other with a predetermined gap therebetween, and the metal waveguide is coupled with the dielectric waveguide in a surface plasmon mode. It is then conceivable to establish coupling between the light propagated through the waveguide and a plasmon generator, a piece of metal, in a surface plasmon mode through a buffer part so that surface plasmons are excited on the plasmon generator, instead of directly irradiating the plasmon generator with the light. According to such a technique, it is possible to transform the light propagated through the waveguide into near-field light with high efficiency. Since the plasmon generator is not directly irradiated with the light propagated through the waveguide, it is also possible to prevent the plasmon generator from excessively increasing in temperature.

In heat-assisted magnetic recording, it is required that intense near-field light be generated from the plasmon generator in order to heat the magnetic recording medium with the near-field light. The above-described technique by itself is not sufficient for that purpose.

For heat-assisted magnetic recording, it is also desired that the position of occurrence of the write magnetic field and the position of occurrence of the near-field light be located as close as possible in the medium facing surface. U.S. Patent Application Publication No. 2007/139818 discloses a magnetic head in which a near-field light generating part that generates near-field light when irradiated with laser light and an end of a main magnetic pole layer are arranged to be laid over each other directly or with a dielectric layer therebetween in the medium facing surface. U.S. Patent Application Publication No. 2009/168220 discloses a magnetic head in which at least a part of a main magnetic pole is interposed between first and second near-field light generating parts each of which generates near-field light when irradiated with laser light.

According to the magnetic heads disclosed in U.S. Patent Application Publication No. 2007/139818 and U.S. Patent Application Publication No. 2009/168220, it is possible that the position of occurrence of the write magnetic field and the position of occurrence of the near-field light are located close to each other. Nevertheless, the direct irradiation of the near-field light generating part with the light precludes efficient transformation of the light into the near-field light.

In the case where a heat-assisted magnetic recording head employs such a configuration that the light propagated through the waveguide is coupled with the plasmon generator in a surface plasmon mode through a buffer part, and the position of occurrence of the write magnetic field and the position of occurrence of the near-field light are located close to each other, there arises the following problem. That is, in such a case, both the waveguide and the magnetic pole need to be located near the plasmon generator. It follows that the magnetic pole is located near the waveguide. The magnetic pole is typically made of a magnetic metal material. The presence of such a magnetic pole near the waveguide produces the problem that part of the light propagated through the waveguide can be absorbed by the magnetic pole and the use efficiency of the light propagated through the waveguide thereby decreases.

OBJECT AND SUMMARY OF THE INVENTION

It is an object of the present invention to provide a heat-assisted magnetic recording head that allows efficient use of light propagated through a waveguide and allows generation of intense near-field light from a plasmon generator, and to provide a head gimbal assembly and a magnetic recording device that each include such a heat-assisted magnetic recording head.

A heat-assisted magnetic recording head of the present invention includes: a medium facing surface that faces a magnetic recording medium; a magnetic pole that has an end face located in the medium facing surface and produces a write magnetic field for writing data on the magnetic recording medium; a waveguide that propagates light; and a plasmon generator.

The waveguide has an evanescent light generating surface that generates evanescent light based on the light propagated through the waveguide. The plasmon generator has an outer surface including a surface plasmon exciting surface, and has a near-field light generating part located in the medium facing surface, the surface plasmon exciting surface being a flat surface that faces the evanescent light generating surface with a predetermined distance therebetween. A surface plasmon is excited on the surface plasmon exciting surface through coupling with the evanescent light generated from the evanescent light generating surface. The near-field light generating part generates near-field light based on the surface plasmon excited on the surface plasmon exciting surface. The surface plasmon exciting surface includes a width changing portion. The width changing portion has a width that decreases with decreasing distance to the medium facing surface, the width being in a direction parallel to the medium facing surface and the evanescent light generating surface. The width changing portion has two sides that lie on opposite sides in the direction of the width. Each of the two sides forms an angle in the range of 3 to 50 degrees with respect to a direction perpendicular to the medium facing surface. The magnetic pole is located at such a position that the plasmon generator is interposed between the magnetic pole and the waveguide. The outer surface of the plasmon generator further includes a pole contact surface that is in contact with the magnetic pole.

In the heat-assisted magnetic recording head of the present invention, the surface plasmon exciting surface may further include a constant width portion. The constant width portion is located farther from the medium facing surface than is the width changing portion, such that the constant width portion is continuous with the width changing portion. The constant width portion has a constant width in the direction parallel to the medium facing surface and the evanescent light generating surface regardless of the distance from the medium facing surface.

In the heat-assisted magnetic recording head of the present invention, the width changing portion may have a front end part that is formed by the two sides meeting each other. The front end part may be located away from the medium facing surface. In such a case, the plasmon generator may further have an edge part that connects the front end part of the width changing portion to the near-field light generating part. The edge part propagates an edge plasmon to the near-field light generating part, the edge plasmon being excited based on the surface plasmon that is excited on the surface plasmon exciting surface.

In the heat-assisted magnetic recording head of the present invention, each of the two sides of the width changing portion may form an angle in the range of 10 to 25 degrees with respect to the direction perpendicular to the medium facing surface.

In the heat-assisted magnetic recording head of the present invention, the outer surface of the plasmon generator may further include a front end face located in the medium facing surface. The front end face may include a tip that forms the near-field light generating part. In such a case, the front end face of the outer surface of the plasmon generator may have two portions that are connected to each other into a V-shape, and the end face of the magnetic pole may have a triangular portion that lies between the two portions of the front end face.

In the heat-assisted magnetic recording head of the present invention, the plasmon generator may have a bottom part that is shaped like a plate and two sidewall parts that are each shaped like a plate, the bottom part including the width changing portion of the surface plasmon exciting surface, the two sidewall parts being located farther from the evanescent light generating surface than is the bottom part and connected to opposite ends of the bottom part in the direction parallel to the medium facing surface and the evanescent light generating surface. The bottom part has a width that decreases with decreasing distance to the medium facing surface, the width being in the direction parallel to the medium facing surface and the evanescent light generating surface. The distance between the two sidewall parts in the direction parallel to the medium facing surface and the evanescent light generating surface increases with increasing distance from the evanescent light generating surface, and decreases with decreasing distance to the medium facing surface. The magnetic pole may include a portion that lies between the two sidewall parts and is in contact with the bottom part and the two sidewall parts. In such a case, the plasmon generator may further have a V-shaped portion that is located between the medium facing surface and each of the bottom part and the two sidewall parts so as to be continuous with the bottom part and the two sidewall parts. The V-shaped portion may be V-shaped in cross section parallel to the medium facing surface. The magnetic pole may include a portion accommodated in the V-shaped portion.

The heat-assisted magnetic recording head of the present invention may further include a buffer part that is located between the evanescent light generating surface and the surface plasmon exciting surface and has a refractive index lower than that of the waveguide.

A head gimbal assembly of the present invention includes: the heat-assisted magnetic recording head of the present invention; and a suspension that supports the heat-assisted magnetic recording head. A magnetic recording device of the present invention includes: a magnetic recording medium; the heat-assisted magnetic recording head of the present invention; and a positioning device that supports the heat-assisted magnetic recording head and positions the same with respect to the magnetic recording medium.

In the heat-assisted magnetic recording head, the head gimbal assembly or the magnetic recording device of the present invention, a surface plasmon is excited on the surface plasmon exciting surface of the plasmon generator through coupling with the evanescent light generated from the evanescent light generating surface of the waveguide. The near-field light generating part generates near-field light based on the surface plasmon. Consequently, the light propagated through the waveguide can be efficiently used to generate near-field light from the plasmon generator. In the present invention, the surface plasmon exciting surface includes the width changing portion. The width of the width changing portion in the direction parallel to the medium facing surface and the evanescent light generating surface decreases with decreasing distance to the medium facing surface. According to the present invention, it is thus possible to efficiently enhance the intensity of the near-field light generated from the plasmon generator. Consequently, the present invention allows efficient use of the light propagated through the waveguide and allows generation of intense near-field light from the plasmon generator.

Other and further objects, features and advantages of the present invention will appear more fully from the following description.

DETAILED DESCRIPTION OF THE PREFERRED EMBODIMENTS

First Embodiment

Figure 8:
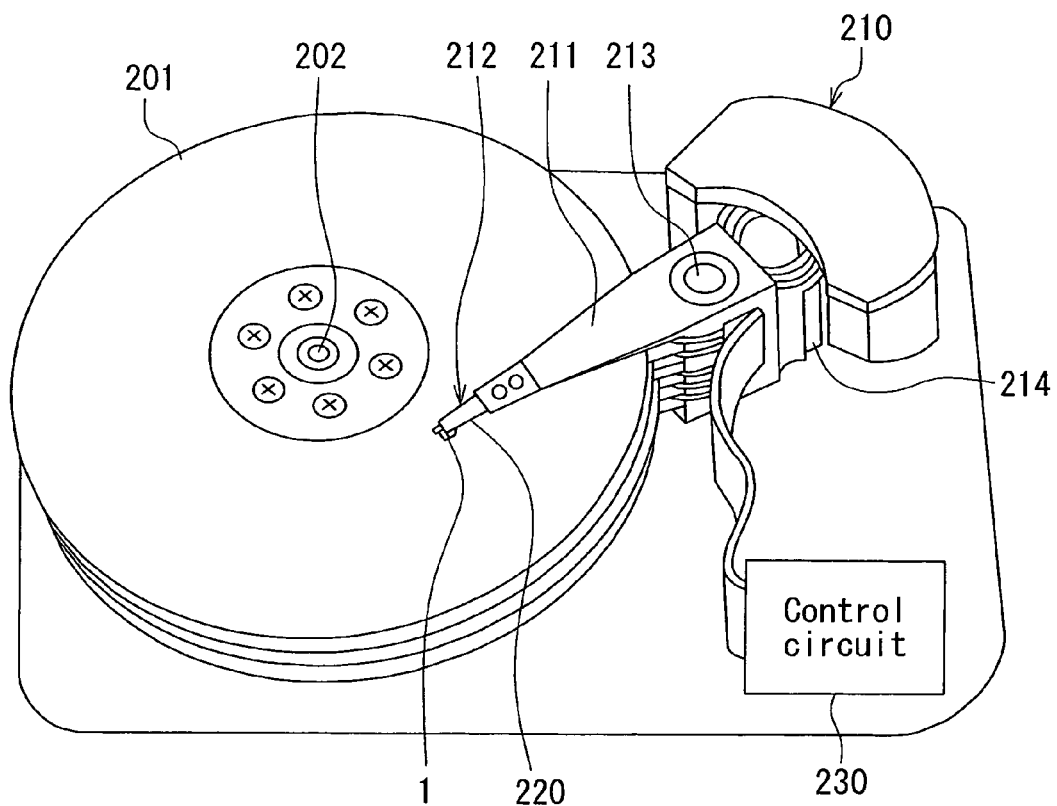
FIG. 8 is a perspective view showing a magnetic recording device according to the first embodiment of the invention.

Preferred embodiments of the present invention will now be described in detail with reference to the drawings. First, reference is made to FIG. 8 to describe a magnetic disk drive as a magnetic recording device according to a first embodiment of the invention. As shown in FIG. 8, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a heat-assisted magnetic recording head 1 according to the present embodiment, and a suspension 220 that supports the heat-assisted magnetic recording head 1.

The assembly carriage device 210 is a device for positioning each heat-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single heat-assisted magnetic recording head 1.

The magnetic disk drive further includes a control circuit 230 that controls the read/write operations of the heat-assisted magnetic recording heads 1 and also controls the light emitting operation of a laser diode serving as a light source for generating laser light for heat-assisted magnetic recording described later.

Figure 9:
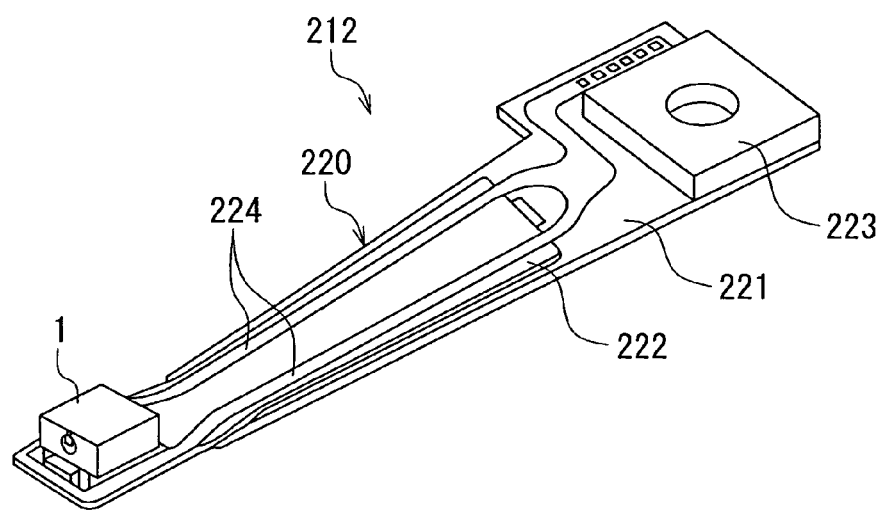
FIG. 9 is a perspective view showing a head gimbal assembly according to the first embodiment of the invention.

FIG. 9 is a perspective view showing the head gimbal assembly 212 of FIG. 8. As previously described, the head gimbal assembly 212 includes the heat-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The heat-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the heat-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to the one having the configuration shown in FIG. 9. For example, the head gimbal assembly of the present invention may have an IC chip for driving the head that is mounted somewhere along the suspension 220.

Figure 10:
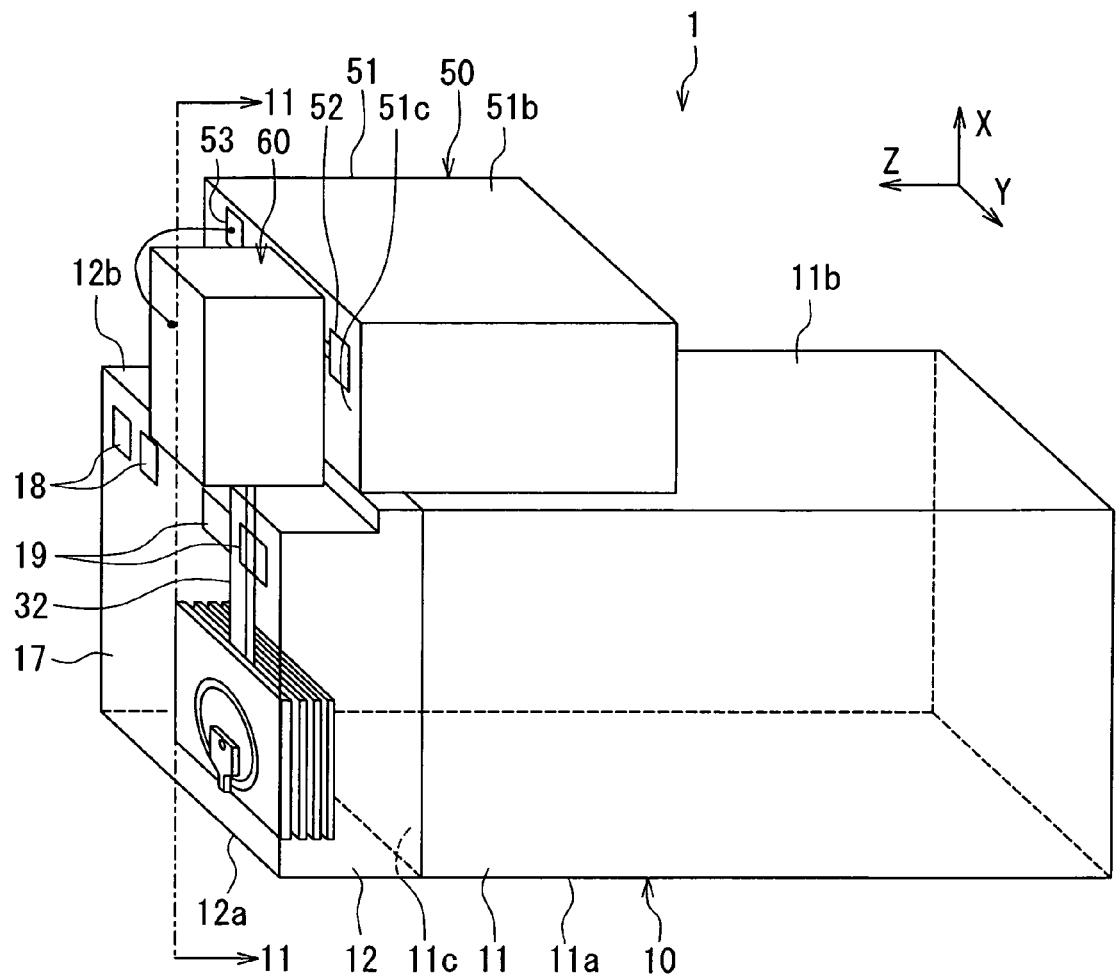
FIG. 10 is a perspective view showing the heat-assisted magnetic recording head according to the first embodiment of the invention.
Figure 11:
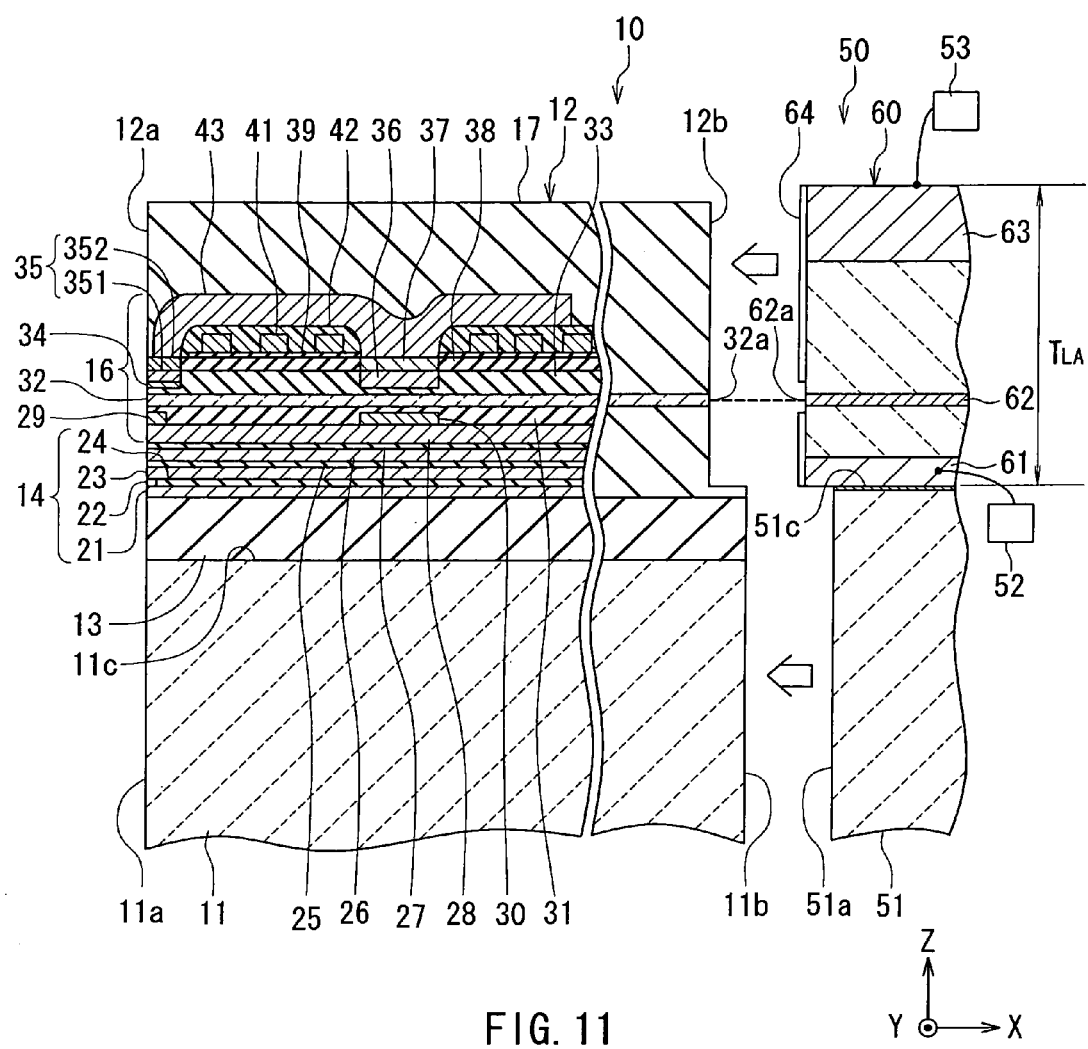
FIG. 11 shows a cross section taken along line 11-11 of FIG. 10.
Figure 12:
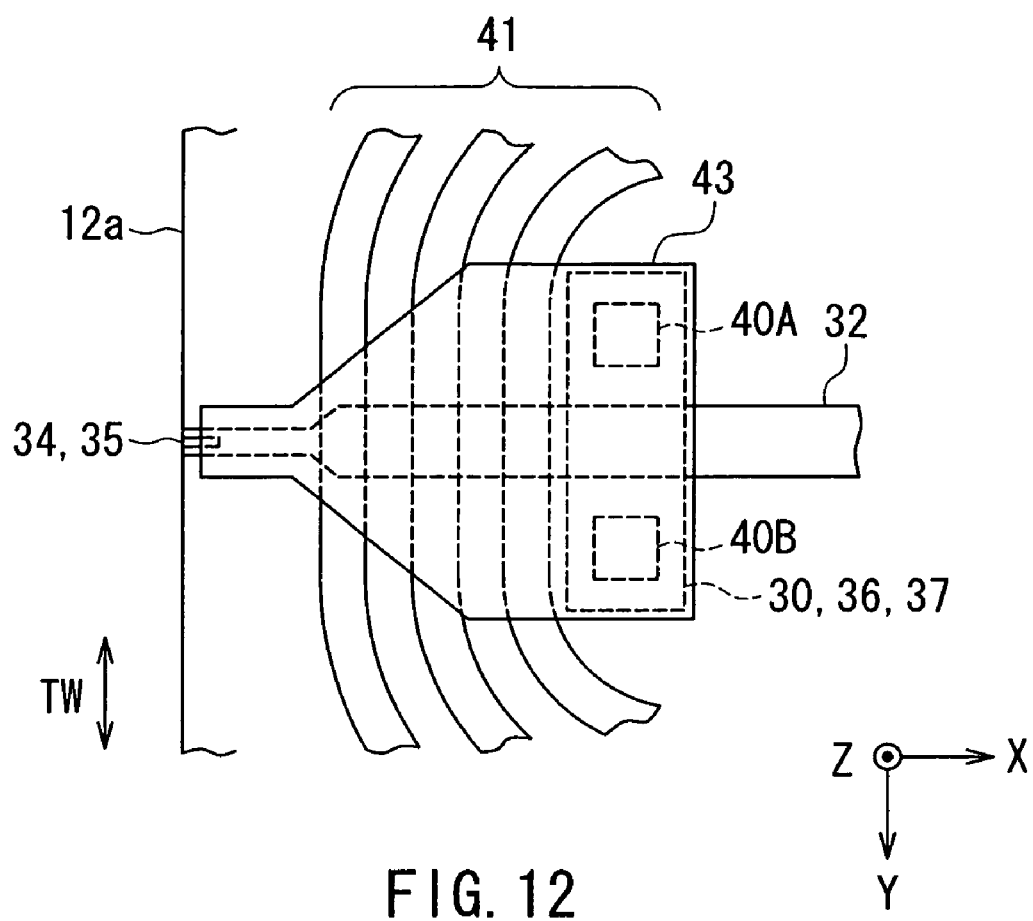
FIG. 12 is a plan view showing a part of the head unit of the heat-assisted magnetic recording head according to the first embodiment of the invention.

The configuration of the heat-assisted magnetic recording head 1 according to the present embodiment will now be described with reference to FIG. 10 to FIG. 12. FIG. 10 is a perspective view of the heat-assisted magnetic recording head 1. FIG. 11 shows a cross section taken along line 11-11 of FIG. 10. FIG. 12 is a plan view showing a part of a head unit of the heat-assisted magnetic recording head. The heat-assisted magnetic recording head 1 includes a slider 10 and a light source unit 50. FIG. 11 shows the state where the slider 10 and the light source unit 50 are separated from each other.

The slider 10 includes a slider substrate 11 and a head unit 12. The slider substrate 11 is rectangular-solid-shaped and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces that connect the medium facing surface 11a to the rear surface 11b. One of the four surfaces that connect the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 with respect to the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head unit 12 are concerned, with respect to a reference position, a position located in a direction that is perpendicular to the element-forming surface 11c and gets away from the element-forming surface 11c is defined as "above", and a position located in a direction opposite to the above-mentioned direction is defined as "below". Where the layers included in the head unit 12 are concerned, the surface closer to the element-forming surface 11c is defined as a "bottom surface," and the surface farther from the element-forming surface 11c as a "top surface."

Moreover, X direction, Y direction, Z direction, –X direction, –Y direction, and –Z direction will be defined as follows. The X direction is a direction perpendicular to the medium facing surface 11a and heading from the medium facing surface 11a toward the rear surface 11b. The Y direction is a direction parallel to the medium facing surface 11a and the element-forming surface 11c and heading from the back side to the front side of FIG. 11. The Z direction is a direction perpendicular to the element-forming surface 11c and getting away from the element-forming surface 11c. The –X direction, the –Y direction, and the –Z direction are opposite to the X direction, the Y direction, and the Z direction, respectively. As viewed from the slider 10, the magnetic disk 201 moves in the Z direction. The slider 10 has an air inflow end (a leading end) at the end of the medium facing surface 11a in the –Z direction. The slider 10 has an air outflow end (a trailing end) at the end of the medium facing surface 12a in the Z direction. Track width direction TW is a direction parallel to the Y direction.

The light source unit 50 includes a laser diode 60 serving as a light source for emitting laser light, and a rectangular-solid-shaped support member 51 that supports the laser diode 60. The support member 51 is made of, for example, a ceramic material such as aluminum oxide-titanium carbide ($Al_2O_3$—TiC). The support member 51 has a bonding surface 51a, a rear surface 51b opposite to the bonding surface 51a, and four surfaces that connect the bonding surface 51a to the rear surface 51b. One of the four surfaces that connect the bonding surface 51a to the rear surface 51b is a light-source-mounting surface 51c. The bonding surface 51a is the surface to be bonded to the rear surface 11b of the slider substrate 11. The light-source-mounting surface 51c is perpendicular to the bonding surface 51a and parallel to the element-forming surface 11c. The laser diode 60 is mounted on the light-source-mounting surface 51c. The support member 51 may have the function of a heat sink for dissipating heat generated by the laser diode 60, in addition to the function of supporting the laser diode 60.

As shown in FIG. 11, the head unit 12 includes an insulating layer 13 disposed on the element-forming surface 11c, and also includes a read head 14, a write head 16, and a protection layer 17 that are stacked in this order on the insulating layer 13. The insulating layer 13 and the protection layer 17 are each made of an insulating material such as $Al_2O_3$ (hereinafter, also referred to as alumina).

The read head 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 around the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element. If the MR element 22 is a TMR element or a CPP-type GMR element, the bottom shield layer 21 and the top shield layer 23 may also function as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes: an insulating layer 25 disposed on the top shield layer 23; a middle shield layer 26 disposed on the insulating layer 25; and an insulating layer 27 disposed on the middle shield layer 26. The middle shield layer 26 has the function of shielding the MR element 22 from a magnetic field produced in the write head 16. The insulating layers 25 and 27 are each made of an insulating material such as alumina. The middle shield layer 26 is made of a soft magnetic material. The insulating layer 25 and the middle shield layer 26 may be omitted.

The write head 16 of the present embodiment is for use in perpendicular magnetic recording. The write head 16 includes: a bottom yoke layer 28 disposed on the insulating layer 27; a bottom shield layer 29 disposed on the bottom yoke layer 28 in the vicinity of the medium facing surface 12a; a coupling layer 30 disposed on the bottom yoke layer 28 at a position away from the medium facing surface 12a; and a clad layer 31 that covers the bottom yoke layer 28, the bottom shield layer 29 and the coupling layer 30. The bottom yoke layer 28, the bottom shield layer 29, and the coupling layer 30 are each made of a soft magnetic material. The clad layer 31 is made of a dielectric material.

The write head 16 further includes a waveguide 32 disposed on the clad layer 31, and a clad layer 33 that covers the clad layer 31 and the waveguide 32. The waveguide 32 extends in the direction perpendicular to the medium facing surface 12a (the X direction). The waveguide 32 has an incident end 32a, an end face closer to the medium facing surface 12a, a top surface, a bottom surface, and two side surfaces. The end face of the waveguide 32 may be located in the medium facing surface 12a or away from the medium facing surface 12a. FIG. 11 shows an example where the end face of the waveguide 32 is located in the medium facing surface 12a. The waveguide 32 propagates laser light that is emitted from the laser diode 60 and incident on the incident end 32a.

The waveguide 32 is made of a dielectric material that transmits the laser light. Each of the clad layers 31 and 33 is made of a dielectric material and has a refractive index lower than that of the waveguide 32. For example, if the laser light has a wavelength of 600 nm and the waveguide 32 is made of $Al_2O_3$ (refractive index n=1.63), the clad layers 31 and 33 may be made of $SiO_2$ (refractive index n=1.46). If the waveguide 32 is made of tantalum oxide such as $Ta_2O_5$ (n=2.16), the clad layers 31 and 33 may be made of $SiO_2$ (n=1.46) or $Al_2O_3$ (n=1.63).

The write head 16 further includes: a plasmon generator 34 disposed above the waveguide 32 near the medium facing surface 12a; and a magnetic pole 35 disposed at such a position that the plasmon generator 34 is interposed between the magnetic pole 35 and the waveguide 32. The plasmon generator 34 is made of a conductive material such as metal. For example, the plasmon generator 34 may be made of one element selected from the group consisting of Pd, Pt, Rh, Ir, Ru, Au, Ag, Cu, and Al, or of an alloy composed of two or more of these elements. The magnetic pole 35 includes a first layer 351, and a second layer 352 lying on the first layer 351. The magnetic pole 35 is made of a soft magnetic material, or a magnetic metal material in particular. The shapes and layout of the waveguide 32, the plasmon generator 34 and the magnetic pole 35 will be detailed later.

The write head 16 further includes: a coupling layer 36 embedded in the clad layer 33 at a position away from the medium facing surface 12a; and a coupling layer 37 lying on the coupling layer 36. The coupling layers 36 and 37 are located above the coupling layer 30. The coupling layers 36 and 37 are each made of a soft magnetic material.

As shown in FIG. 12, the write head 16 further includes two coupling portions 40A and 40B that are embedded in the clad layers 31 and 33. The coupling portions 40A and 40B are each made of a soft magnetic material. The coupling portions 40A and 40B are located on opposite sides of the waveguide 32 in the track width direction TW, each at a distance from the waveguide 32. The bottom surfaces of the coupling portions 40A and 40B are in contact with the top surface of the coupling layer 30. The top surfaces of the coupling portions 40A and 40B are in contact with the bottom surface of the coupling layer 36.

The write head 16 further includes: an insulating layer 38 disposed around the second layer 352 of the magnetic pole 35 and the coupling layer 37; an insulating layer 39 disposed on the insulating layer 38; a coil 41 disposed on the insulating layer 39; and an insulating layer 42 covering the coil 41. The insulating layers 38 and 39 are each made of an insulating material such as alumina. The coil 41 is planar spiral-shaped and wound around the coupling layer 37. The coil 41 produces a magnetic field corresponding to data to be written on the magnetic disk 201. The coil 41 is made of a conductive material such as copper. The insulating layer 42 is made of photoresist, for example.

The write head 16 further includes a top yoke layer 43. The top yoke layer 43 is disposed over the second layer 352 of the magnetic pole 35, the insulating layer 42 and the coupling layer 37. The top yoke layer 43 is in contact with the top surface of the second layer 352 at a position near the medium facing surface 12a, and in contact with the top surface of the coupling layer 37 at a position away from the medium facing surface 12a.

In the write head 16, the bottom shield layer 29, the bottom yoke layer 28, the coupling layer 30, the coupling portions 40A and 40B, the coupling layers 36 and 37, the top yoke layer 43, and the magnetic pole 35 form a magnetic path for passing a magnetic flux corresponding to the magnetic field produced by the coil 41. The magnetic pole 35 has an end face located in the medium facing surface 12a, allows the magnetic flux corresponding to the magnetic field produced by the coil 41 to pass, and produces a write magnetic field for writing data on the magnetic disk 201 by means of the perpendicular magnetic recording system. The bottom shield layer 29 takes in a magnetic flux that is generated from the end face of the magnetic pole 35 and that expands in directions other than the direction perpendicular to the plane of the magnetic disk 201, and thereby prevents the magnetic flux from reaching the magnetic disk 201.

As shown in FIG. 11, the protection layer 17 is disposed to cover the write head 16. As shown in FIG. 10, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 41. These terminals 18 and 19 are electrically connected to the plurality of pad-shaped terminals of the wiring member 224 shown in FIG. 9.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 µm. Specifically, the laser diode 60 may be an InGaAsP/InP quarternary mixed crystal laser diode having an emittable wavelength range of 1.2 to 1.67 µm, for example.

As shown in FIG. 11, the laser diode 60 has a multilayer structure including a lower electrode 61, an active layer 62, and an upper electrode 63. A reflecting layer 64 made of, for example, SiO$_2$ or Al$_2$O$_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness T$_{LA}$ of around 60 to 200 µm, for example.

The light source unit 50 further includes a terminal 52 disposed on the light-source-mounting surface 51c and electrically connected to the lower electrode 61, and a terminal 53 disposed on the light-source-mounting surface 51c and electrically connected to the upper electrode 63. These terminals 52 and 53 are electrically connected to the plurality of pad-shaped terminals of the wiring member 224 shown in FIG. 9. When a predetermined voltage is applied to the laser diode 60 through the terminals 52 and 53, laser light is emitted from the emission center 62a of the laser diode 60. The laser light to be emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is fixed to the slider 10 by bonding the bonding surface 51a of the support member 51 to the rear surface 11b of the slider substrate 11, as shown in FIG. 11. The laser diode 60 and the waveguide 32 are positioned so that the laser light emitted from the laser diode 60 will be incident on the incident end 32a of the waveguide 32.

Figure 1:
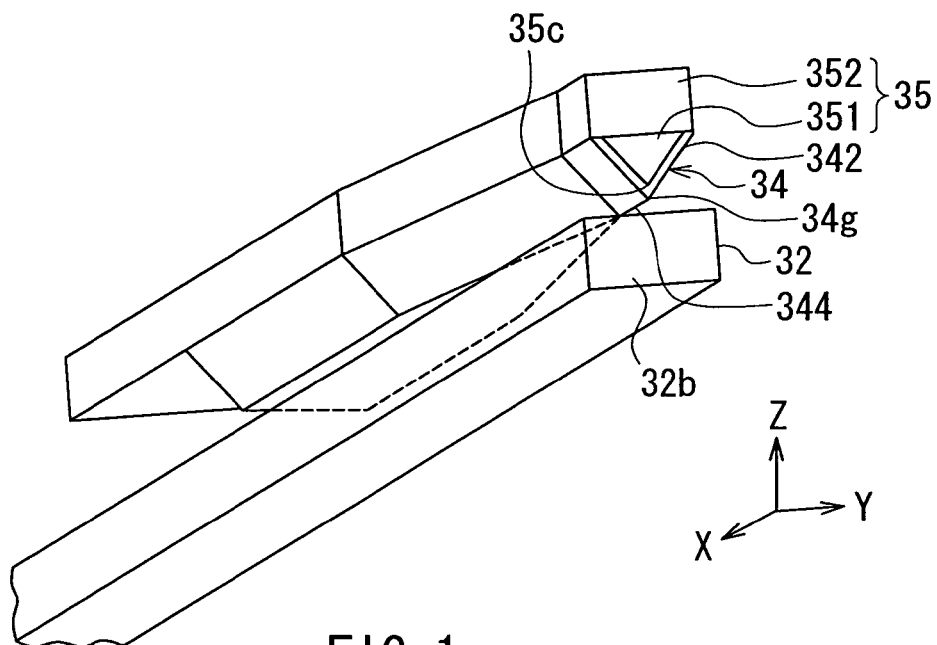
FIG. 1 is a perspective view showing a waveguide, a plasmon generator, and a magnetic pole of a heat-assisted magnetic recording head according to a first embodiment of the invention.
Figure 2:
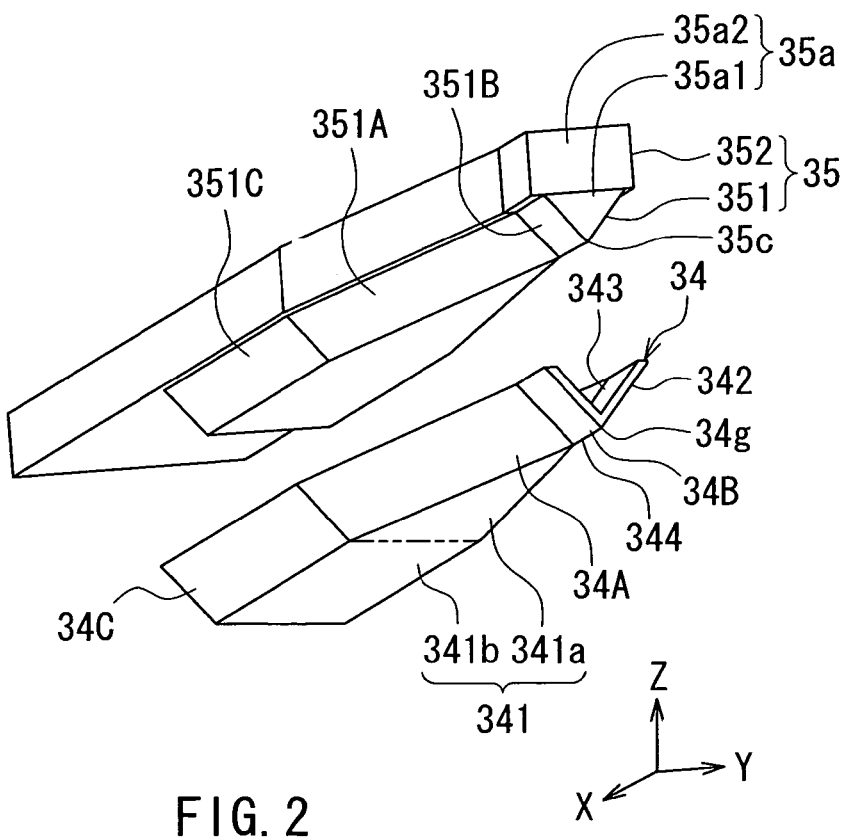
FIG. 2 is an exploded perspective view of the plasmon generator and the magnetic pole shown in FIG. 1.
Figure 3:
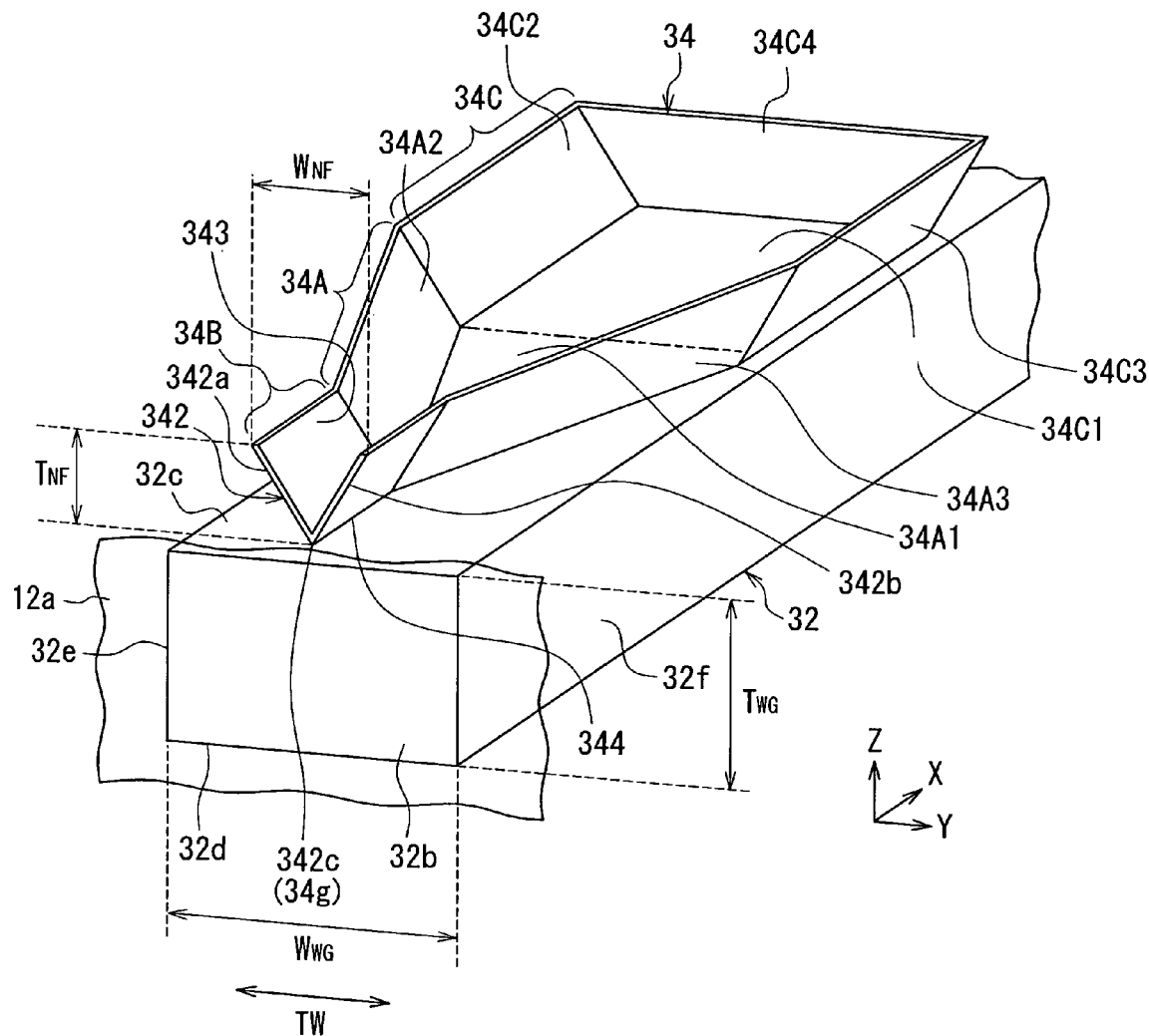
FIG. 3 is a perspective view of the waveguide and the plasmon generator shown in FIG. 1.
Figure 4:
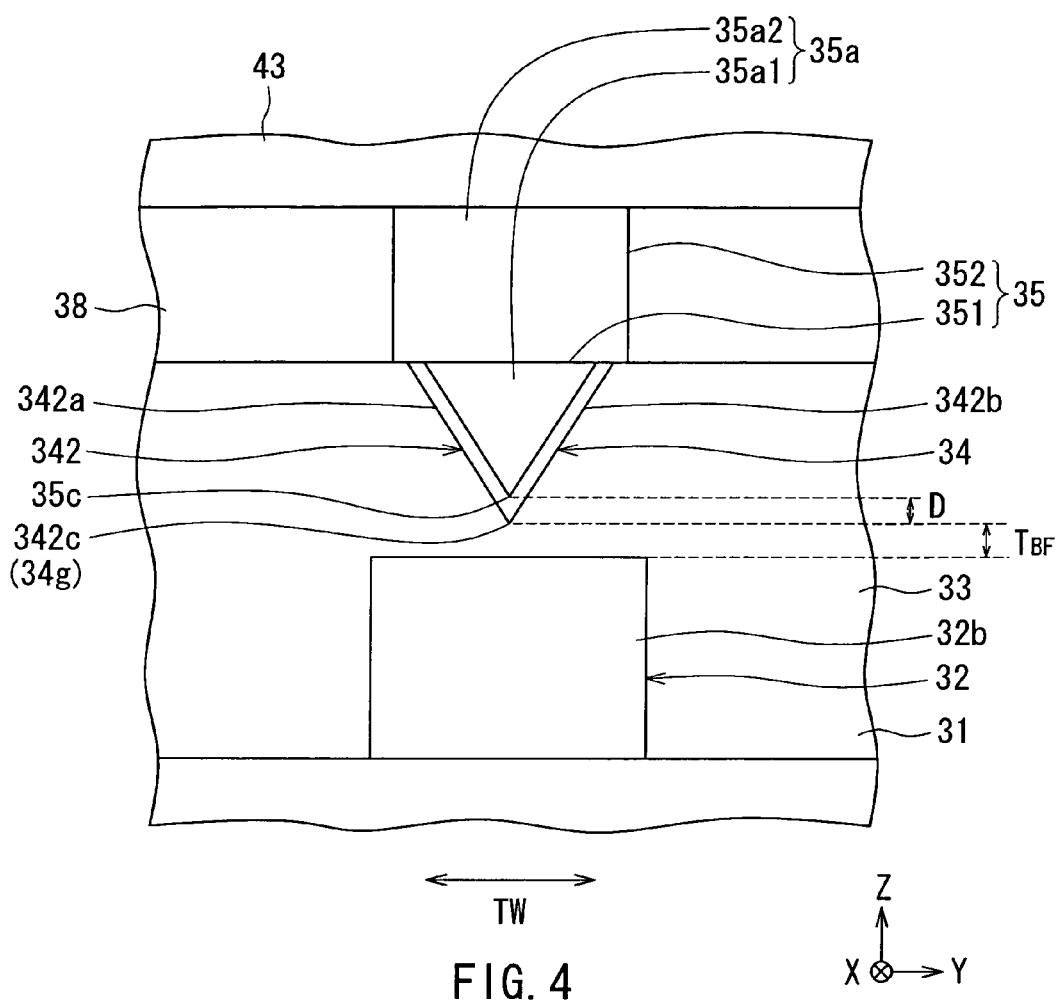
FIG. 4 is a front view showing a part of the medium facing surface of a head unit of the heat-assisted magnetic recording head according to the first embodiment of the invention.
Figure 5:
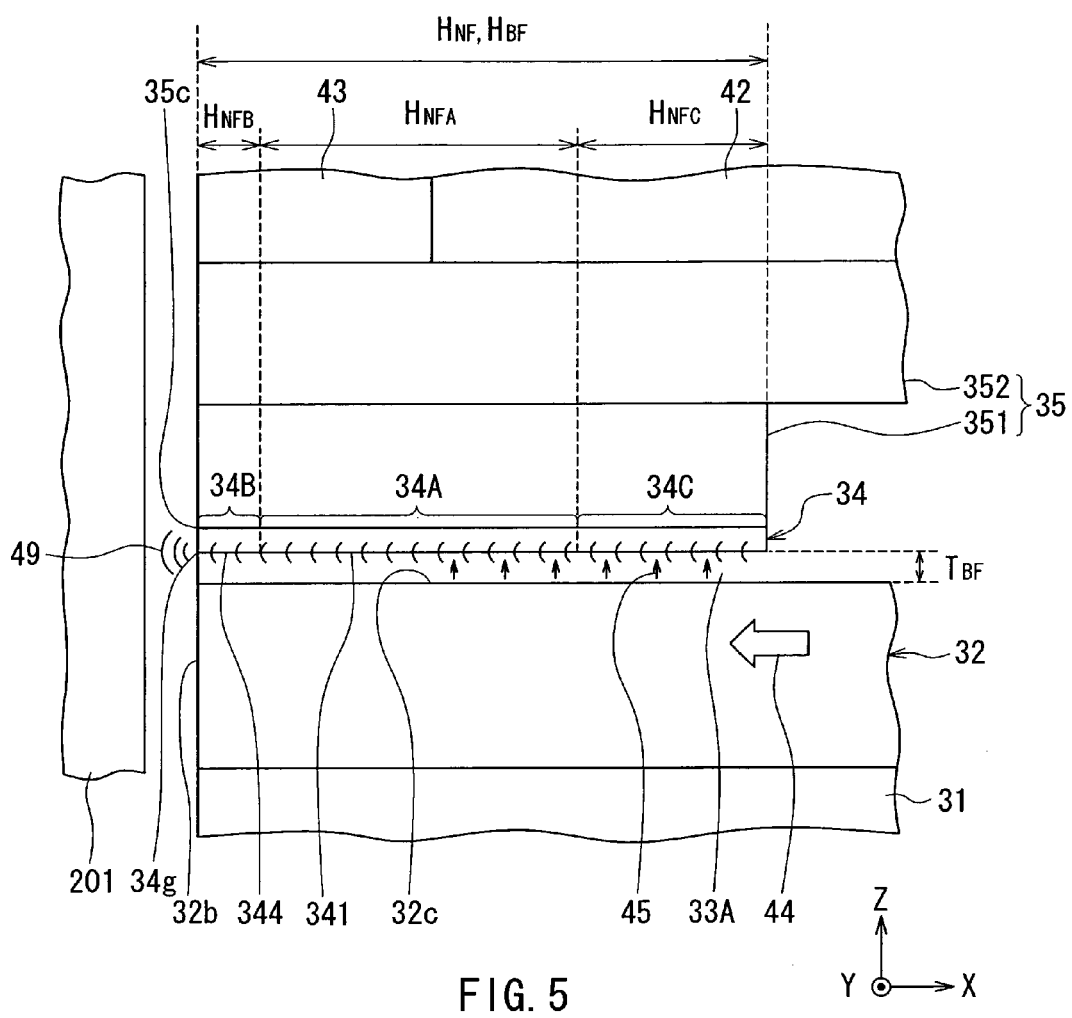
FIG. 5 is a cross-sectional view showing the waveguide, the plasmon generator, and the magnetic pole of the heat-assisted magnetic recording head according to the first embodiment of the invention.
Figure 6:
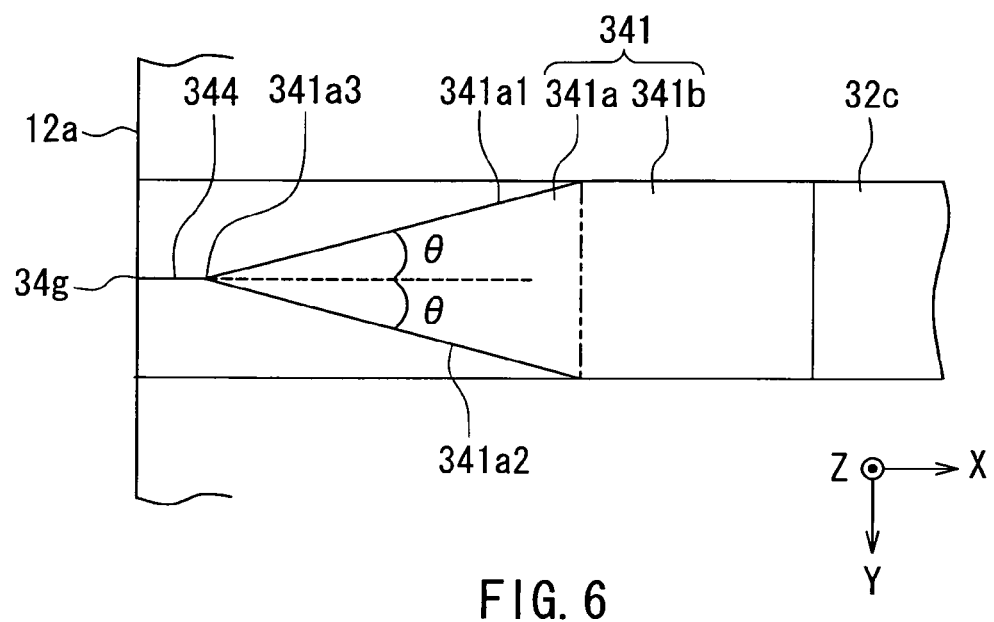
FIG. 6 is a plan view showing a portion of the plasmon generator of FIG. 1 that faces the waveguide.

The shapes and layout of the waveguide 32, the plasmon generator 34, and the magnetic pole 35 will now be described in detail with reference to FIG. 1 to FIG. 6. FIG. 1 is a perspective view showing the waveguide 32, the plasmon generator 34, and the magnetic pole 35. FIG. 2 is an exploded perspective view of the plasmon generator 34 and the magnetic pole 35 shown in FIG. 1. FIG. 3 is a perspective view of the waveguide 32 and the plasmon generator 34. FIG. 4 is a front view showing a part of the medium facing surface 12a of the head unit 12. FIG. 5 is a cross-sectional view showing the waveguide 32, the plasmon generator 34, and the magnetic pole 35. FIG. 6 is a plan view showing a portion of the plasmon generator 34 that faces the waveguide 32 as seen from above.

Aside from the incident end 32a shown in FIG. 11, the waveguide 32 further has: an end face 32b that is closer to the medium facing surface 12a; an evanescent light generating surface 32c, which is a top surface; a bottom surface 32d; and two side surfaces 32e and 32f, as shown in FIG. 3. The evanescent light generating surface 32c generates evanescent light based on the light propagated through the waveguide 32. FIG. 1 to FIG. 6 show an example where the end face 32b is located in the medium facing surface 12a. The end face 32b may be located away from the medium facing surface 12a, however.

As shown in FIG. 3, the plasmon generator 34 includes: a first portion 34A that is located away from the medium facing surface 12a; a second portion 34B that is located between the first portion 34A and the medium facing surface 12a so as to be continuous with the first portion 34A; and a third portion 34C that is located farther from the medium facing surface 12a than is the first portion 34A, such that the third portion 34C is continuous with the first portion 34A. In FIG. 3, the border between the first portion 34A and the third portion 34C is shown by a chain double-dashed line.

The first portion 34A has: a bottom part 34A1 that is shaped like a plate and faces the evanescent light generating surface 34c; and two sidewall parts 34A2 and 34A3 that are each shaped like a plate. The two sidewall parts 34A2 and 34A3 are located farther from the evanescent light generating surface 32c than is the bottom part 34A1, and are connected to opposite ends of the bottom part 34A1 in a direction parallel to the medium facing surface 12a and the evanescent light generating surface 32c (the Y direction).

The bottom part 34A1 has a width that decreases with decreasing distance to the medium facing surface 12a, the width being in the direction parallel to the medium facing surface 12a and the evanescent light generating surface 32c (the Y direction). At the end of the first portion 34A closer to the medium facing surface 12a, the bottom part 34A1 has a zero width and the respective bottom ends of the sidewall parts 34A2 and 34A3 are in contact with each other.

The distance between the two sidewall parts 34A2 and 34A3 in the direction parallel to the medium facing surface 12a and the evanescent light generating surface 32c (the Y direction) increases with increasing distance from the evanescent light generating surface 32c, and decreases with decreasing distance to the medium facing surface 12a.

The second portion 34B is continuous with the bottom part 34A1 and the sidewall parts 34A2 and 34A3 of the first portion 34A. The second portion 34B is V-shaped in cross section parallel to the medium facing surface 12a. The maximum width of the second portion 34B in the direction parallel to the medium facing surface 12a and the evanescent light generating surface 32c (the Y direction) is constant regardless of the distance from the medium facing surface 12a. The second portion 34B corresponds to the V-shaped portion of the present invention.

The third portion 34C has: a bottom part 34C1 that is continuous with the bottom part 34A1 of the first portion 34A; a sidewall part 34C2 that is continuous with the sidewall part 34A2 of the first portion 34A; a sidewall part 34C3 that is continuous with the sidewall part 34A3 of the first portion 34A; and a wall part 34C4 that connects respective ends of the bottom part 34C1 and the sidewall parts 34C2 and 34C3 to each other, the ends being farther from the medium facing surface 12a. The bottom part 34C1 has a constant width in the direction parallel to the medium facing surface 12a and the evanescent light generating surface 32c (the Y direction) regardless of the distance from the medium facing surface 12a. The third portion 34C need not necessarily have the wall part 34C4.

The distance between the two sidewall parts 34C2 and 34C3 in the direction parallel to the medium facing surface 12a and the evanescent light generating surface 32c (the Y direction) increases with increasing distance from the evanescent light generating surface 32c, but does not change according to the distance from the medium facing surface 12a.

As shown in FIG. 2 and FIG. 3, the first portion 34A, the second portion 34B, and the third portion 34C form inside a space for accommodating the first layer 351 of the magnetic pole 35.

The plasmon generator 34 has an outer surface including a plurality of portions described below, and has a near-field light generating part 34g located in the medium facing surface 12a. As shown in FIG. 2, the outer surface of the plasmon generator 34 includes a surface plasmon exciting surface 341 which is a flat surface that faces the evanescent light generating surface 32c of the waveguide 32 with a predetermined distance therebetween. The surface plasmon exciting surface 341 includes a width changing portion 341a formed by the bottom surface of the bottom part 34A1 of the first portion 34A, and a constant width portion 341b formed by the bottom surface of the bottom part 34C1 of the third portion 34C. In FIG. 2, the border between the width changing portion 341a and the constant width portion 341b is shown by a chain double-dashed line.

As shown in FIG. 5, the part of the clad layer 33 that is interposed between the evanescent light generating surface 32c and the surface plasmon exciting surface 341 forms a buffer part 33A having a refractive index lower than that of the waveguide 32.

FIG. 6 shows the surface plasmon exciting surface 341 and the evanescent light generating surface 32c as seen from above. In FIG. 6, the border between the width changing portion 341a and the constant width portion 341b is shown by a chain double-dashed line. As shown in FIG. 6, the width changing portion 341a has a width that decreases with decreasing distance to the medium facing surface 12a, the width being in the direction parallel to the medium facing surface 12a and the evanescent light generating surface 32c (the Y direction). The width changing portion 341a has two sides 341a1 and 341a2 that lie on opposite sides in the direction of the width (the Y direction), and a front end part 341a3 that is formed by the two sides 341a1 and 341a2 meeting each other. The front end part 341a3 is located away from the medium facing surface 12a. The angle that the side 341a1 forms with respect to the direction perpendicular to the medium facing surface 12a (the X direction) is equal to the angle that the side 341a2 forms with respect to the direction perpendicular to the medium facing surface 12a (the X direction). This angle will hereinafter be represented by θ. The angle θ falls within the range of 3 to 50 degrees, and preferably within the range of 10 to 25 degrees. The reason for this will be described in detail later.

As shown in FIG. 6, the constant width portion 341b is located farther from the medium facing surface 12a than is the width changing portion 341a, such that the constant width portion 341b is continuous with the width changing portion 341a. The constant width portion 341b has a constant width in the direction parallel to the medium facing surface 12a and the evanescent light generating surface 32c (the Y direction) regardless of the distance from the medium facing surface 12a.

As shown in FIG. 1 to FIG. 3, the outer surface of the plasmon generator 34 further includes a front end face 342 that is located in the medium facing surface 12a, and a pole contact surface 343 that is in contact with the magnetic pole 35. The front end face 342 has two portions 342a and 342b that are connected to each other into a V-shape, and a tip 342c that is located at the bottom end of the front end face 342. The tip 342c forms the near-field light generating part 34g. The tip 342c may be rounded.

The pole contact surface 343 is composed of the respective surfaces of the first, second, and third portions 34A, 34B and 34C facing the space for accommodating the first layer 351 of the magnetic pole 35, and the respective top end surfaces of the first, second, and third portions 34A, 34B and 34C. The respective surfaces of the first, second, and third portions 34A, 34B and 34C facing the space for accommodating the first layer 351 of the magnetic pole 35 are in contact with the first layer 351 of the magnetic pole 35. The respective top end surfaces of the first to third portions 34A, 34B and 34C are in contact with the second layer 352 of the magnetic pole 35.

As shown in FIG. 1 to FIG. 3, the plasmon generator 34 further has an edge part 344 that is formed by the bottom end of the second portion 34B. As shown in FIG. 6, the edge part 344 connects the front end part 341a3 of the width changing portion 341a to the near-field light generating part 34g. The edge part 344 may be rounded.

As shown in FIG. 2, the magnetic pole 35 has an end face 35a located in the medium facing surface 12a. The end face 35a includes an end face 35a1 of the first layer 351 located in the medium facing surface 12a and an end face 35a2 of the second layer 352 located in the medium facing surface 12a.

The first layer 351 of the magnetic pole 35 is accommodated in the space formed by the first portion 34A, the second portion 34B and the third portion 34C of the plasmon generator 34. The first layer 351 includes a first portion 351A, a second portion 351B, and a third portion 351C. The first portion 351A is accommodated in the space formed by the first portion 34A. The second portion 351B is accommodated in the space formed by the second portion 34B. The third portion 351C is accommodated in the space formed by the third portion 34C.

The first portion 351A lies between the two sidewall parts 34A2 and 34A3 of the first portion 34A of the plasmon generator 34, and is in contact with the bottom part 34A1 and the two sidewall parts 34A2 and 34A3. The width of the first portion 351A in the direction parallel to the medium facing surface 12a and the evanescent light generating surface 32c (the Y direction) increases with increasing distance from the evanescent light generating surface 32c, and decreases with decreasing distance to the medium facing surface 12a.

The second portion 351B is shaped like a triangular prism. The second portion 351B has a constant width in the direction parallel to the medium facing surface 12a and the evanescent light generating surface 32c (the Y direction) regardless of the distance from the medium facing surface 12a. The end face of the second portion 351B located in the medium facing surface 12a, i.e., the end face 35a1 of the first layer 351 located in the medium facing surface 12a, lies between the two portions 342a and 342b of the front end face 342 of the plasmon generator 34 and has a triangular shape. The end face 35a1 has a tip 35c located at its bottom end.

The third portion 351C lies between the two sidewall parts 34C2 and 34C3 of the third portion 34C of the plasmon generator 34, and is in contact with the bottom part 34C1 and the two sidewall parts 34C2 and 34C3. The width of the third portion 351C in the direction parallel to the medium facing surface 12a and the evanescent light generating surface 32c (the Y direction) increases with increasing distance from the evanescent light generating surface 32c, but does not change according to the distance from the medium facing surface 12a.

The second layer 352 of the magnetic pole 35 has a bottom surface that is in contact with the top surface of the first layer 351 and the respective top end surfaces of the first to third portions 34A, 34B and 34C of the plasmon generator 34.

The plasmon generator 34 need not necessarily have the second portion 34B. When the plasmon generator 34 does not have the second portion 34B, the end of the first portion 34A closer to the medium facing surface 12a is located in the medium facing surface 12a. In such a case, the first layer 351 of the magnetic pole 35 does not have the second portion 351B, and the end of the first portion 351A closer to the medium facing surface 12a is located in the medium facing surface 12a. The plasmon generator 34 need not necessarily have the third portion 34C, either. When the plasmon generator 34 does not have the third portion 34C, the first layer 351 of the magnetic pole 35 does not have the third portion 351C.

As shown in FIG. 3, the width of the waveguide 32 in the track width direction TW (the Y direction) in the vicinity of the plasmon generator 34 will be denoted by the symbol $W_{WG}$. The thickness (dimension in the Z direction) of the waveguide 32 in the vicinity of the plasmon generator 34 will be denoted by the symbol $T_{WG}$. $W_{WG}$ falls within the range of 0.3 to 100 μm, for example. $T_{WG}$ falls within the range of 0.1 to 4 μm, for example. As shown in FIG. 12, the waveguide 32 excluding the part in the vicinity of the plasmon generator 34 may have a width greater than $W_{WG}$.

As shown in FIG. 3, the dimension of the plasmon generator 34 in the track width direction TW (the Y direction) at the medium facing surface 12a will be denoted by the symbol $W_{NF}$. The dimension of the plasmon generator 34 in the Z direction at the medium facing surface 12a will be denoted by the symbol $T_{NF}$. Both $W_{NF}$ and $T_{NF}$ are sufficiently smaller than the wavelength of laser light to be propagated through the waveguide 32. $W_{NF}$ and $T_{NF}$ each fall within the range of 10 to 100 nm, for example.

As shown in FIG. 5, the length of the plasmon generator 34 in the X direction will be denoted by the symbol $H_{NF}$. $H_{NF}$ falls within the range of 0.6 to 4.0 μm, for example. The lengths of the first portion 34A, the second portion 34B, and the third portion 34C of the plasmon generator 34 in the X direction will be denoted by the symbols $H_{NFA}$, $H_{NFB}$, and $H_{NFC}$, respectively. $H_{NFA}$ falls within the range of 200 to 2000 nm, for example. $H_{NFB}$ falls within the range of 0 to 300 nm, for example. $H_{NFC}$ falls within the range of 0 to 2000 nm, for example.

As shown in FIG. 5, the X-direction length of a portion of the bottom end of the plasmon generator 34 that faces the evanescent light generating surface 32c will be denoted by the symbol $H_{BF}$. The distance between the surface plasmon exciting surface 341 and the evanescent light generating surface 32c will be denoted by the symbol $T_{BF}$. Both $H_{BF}$ and $T_{BF}$ are important parameters in achieving appropriate excitation and propagation of surface plasmons. $H_{BF}$ preferably falls within the range of 0.6 to 4.0 μm, and is preferably greater than the wavelength of the laser light to be propagated through the waveguide 32. In the example shown in FIG. 5, the end face 32b of the waveguide 32 is located in the medium facing surface 12a, so that $H_{BF}$ is equal to $H_{NF}$. $T_{BF}$ preferably falls within the range of 10 to 100 nm. As shown in FIG. 4, the distance between the tip 342c of the front end face 342 of the plasmon generator 34 and the end face 32b of the waveguide 32 is equal to $T_{BF}$.

As shown in FIG. 4, the distance between the tip 342c of the front end face 342 of the plasmon generator 34 and the tip 35c of the end face 35a1 of the first layer 351 of the magnetic pole 35 will be denoted by the symbol D. D preferably falls within the range of 10 to 100 nm.

Figure 7:
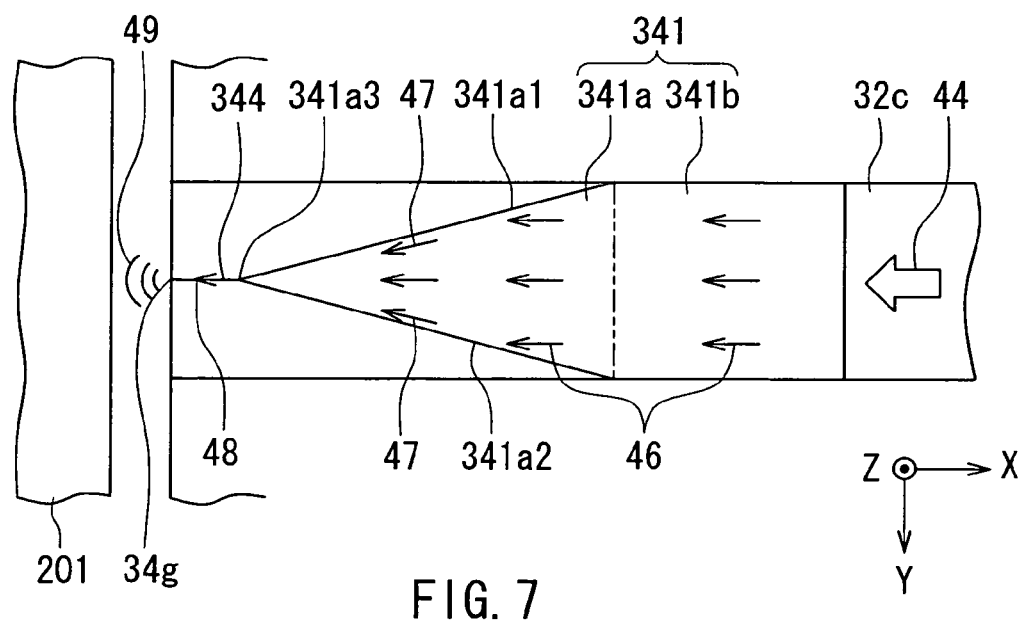
FIG. 7 is an explanatory diagram for explaining the principle of generation of near-field light in the first embodiment of the invention.

Reference is now made to FIG. 5 and FIG. 7 to describe the principle of generation of near-field light in the present embodiment and the principle of heat-assisted magnetic recording using the near-field light. Like FIG. 6, FIG. 7 shows the surface plasmon exciting surface 341 and the evanescent light generating surface 32c as seen from above.

Laser light 44 emitted from the laser diode 60 is propagated through the waveguide 32 to reach the vicinity of the plasmon generator 34. Here, the laser light 44 is totally reflected at the evanescent light generating surface 32c which is the interface between the waveguide 32 and the buffer part 33A. This generates evanescent light 45 permeating into the buffer part 33A. Then, the evanescent light 45 and fluctuations of charges on the surface plasmon exciting surface 341 of the outer surface of the plasmon generator 34 are coupled with each other to induce a surface plasmon polariton mode. In this way, surface plasmons 46 are excited on the surface plasmon exciting surface 341 through coupling with the evanescent light 45 generated from the evanescent light generating surface 32c.

The surface plasmons 46 propagate over the surface plasmon exciting surface 341 toward the near-field light generating part 34g. The surface plasmon exciting surface 341 includes the width changing portion 341a. The width of the width changing portion 341a in the direction parallel to the medium facing surface 12a and the evanescent light generating surface 32c (the Y direction) decreases with decreasing distance to the medium facing surface 12a. Consequently, as will be described later, when the surface plasmons 46 propagate over the width changing portion 341a, the surface plasmons 46 are gradually transformed into edge plasmons 47 which are surface plasmons to propagate along the sides 341a1 and 341a2, and the plasmons including the surface plasmons 46 and the edge plasmons 47 are enhanced in electric field intensity.

The surface plasmons 46 and the edge plasmons 47 reach the edge part 344 and are transformed into edge plasmons 48 to propagate through the edge part 344. The edge plasmons 48 eventually reach the near-field light generating part 34g. Consequently, the edge plasmons 48 concentrate at the near-field light generating part 34g, and near-field light 49 occurs from the near-field light generating part 34g based on the edge plasmons 48. The near-field light 49 is projected toward the magnetic disk 201, reaches the surface of the magnetic disk 201, and heats a part of the magnetic recording layer of the magnetic disk 201. This lowers the coercivity of the part of the magnetic recording layer. In heat-assisted magnetic recording, the part of the magnetic recording layer with the lowered coercivity is subjected to a write magnetic field produced by the magnetic pole 35 for data writing.

The enhancement of the electric field intensity of the plasmons in the width changing portion 341a is presumably based on the following first and second principles. Initially, a description will be given of the first principle. In the present embodiment, as mentioned previously, surface plasmons 46 are initially excited on the surface plasmon exciting surface 341 through coupling with the evanescent light 45 that occurs from the evanescent light generating surface 32c. The surface plasmons 46 propagate over the surface plasmon exciting surface 341 toward the near-field light generating part 34g. The surface plasmon exciting surface 341 includes the width changing portion 341a. The width changing portion 341a decreases in width with decreasing distance to the medium facing surface 12a. The wave number of the surface plasmons 46 propagating through the width changing portion 341a increases with a decrease in width of the width changing portion 341a. As the wave number of the surface plasmons 46 increases, the speed of travel of the surface plasmons 46 decreases. This consequently increases the energy density of the surface plasmons 46 and enhances the electric field intensity of the surface plasmons 46.

Next, a description will be given of the second principle. When the surface plasmons 46 propagate over the surface plasmon exciting surface 341 toward the near-field light generating part 34g, some of the surface plasmons 46 impinge on the sides 341a1 and 341a2 of the width changing portion 341a to scatter, thereby generating a plurality of plasmons with different wave numbers. Some of the plurality of plasmons thus generated are transformed into edge plasmons 47 which have a wave number higher than those of the surface plasmons propagating over a flat surface. In this way, the surface plasmons 46 are gradually transformed into the edge plasmons 47 to propagate along the sides 341a1 and 341a2, whereby the edge plasmons 47 gradually increase in electric field intensity. As compared with the surface plasmons propagating over a flat surface, the edge plasmons 47 are higher in wave number and lower in speed of travel. Consequently, the transformation of the surface plasmons 46 into the edge plasmons 47 increases the energy density of the plasmons. In the width changing portion 341a, the foregoing transformation of the surface plasmons 46 into the edge plasmons 47 is accompanied by the generation of new surface plasmons 46 based on the evanescent light 45 occurring from the evanescent light generating surface 32c. The new surface plasmons 46 are also transformed into edge plasmons 47. As a result, the edge plasmons 47 increase in electric field intensity. The edge plasmons 47 are transformed into edge plasmons 48 to propagate through the edge part 344. This generates the edge plasmons 48 of enhanced electric field intensity as compared with the surface plasmons 46 originally generated.

In the present embodiment, the surface plasmons 46 propagating over the flat surface and the edge plasmons 47 having a wave number higher than that of the surface plasmons 46 coexist in the width changing portion 341a. It can be considered that both the surface plasmons 46 and the edge plasmons 47 increase in electric field intensity in the width changing portion 341a based on the first and second principles described above. According to the present embodiment, it is therefore possible to enhance the electric field intensity of the plasmons as compared with a case where either one of the first principle and the second principle is in operation.

Figure 13:
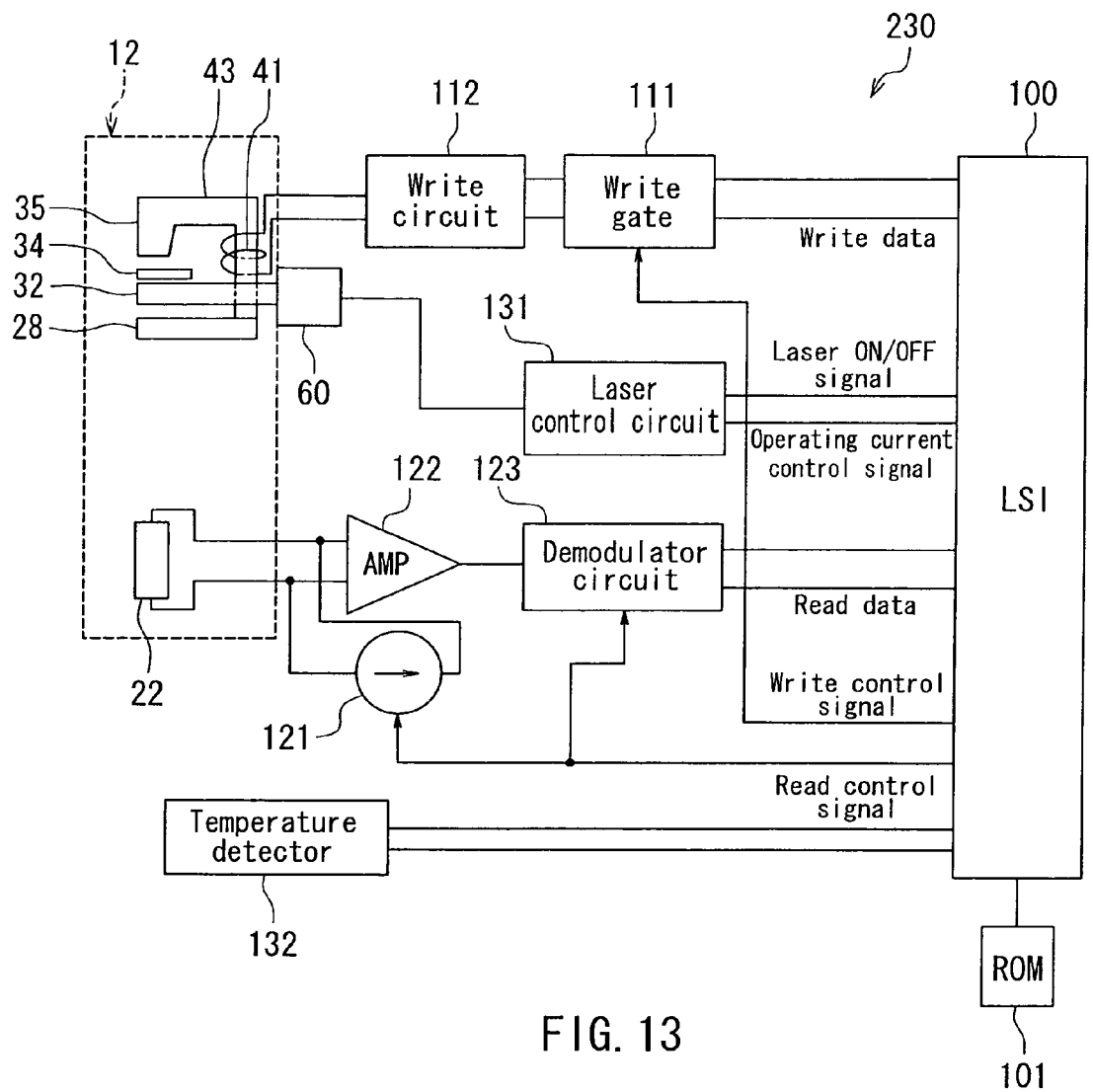
FIG. 13 is a block diagram showing the circuit configuration of the magnetic recording device according to the first embodiment of the invention.

Reference is now made to FIG. 13 to describe the circuit configuration of the control circuit 230 shown in FIG. 8 and the operation of the heat-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 41. Consequently, the magnetic pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light is propagated through the waveguide 32. According to the principle of generation of near-field light described previously, the near-field light 49 occurs from the near-field light generating part 34g of the plasmon generator 34. The near-field light 49 heats a part of the magnetic recording layer of the magnetic disk 201, thereby lowering the coercivity of that part. When writing, the part of the magnetic recording layer with the lowered coercivity is subjected to the write magnetic field produced by the magnetic pole 35 for performing data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 49, and data that indicates the temperature dependence of the coercivity of the magnetic recording layer.

As shown in FIG. 13, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the circuit configuration of the control circuit 230 is not limited to the one shown in FIG. 13.

Next, a method of manufacturing the slider 10 of the present embodiment will be described briefly. The method of manufacturing the slider 10 includes the steps of forming components of a plurality of sliders 10 other than the slider substrates 11 on a substrate that includes portions to become the slider substrates 11 of the plurality of sliders 10, thereby fabricating a substructure that includes pre-slider portions arranged in a plurality of rows, the pre-slider portions being intended to become the sliders 10 later; and forming the plurality of sliders 10 by cutting the substructure to separate the plurality of pre-slider portions from each other. In the step of forming the plurality of sliders 10, the surfaces formed by cutting are polished into the medium facing surfaces 11a and 12a.

Figure 14:
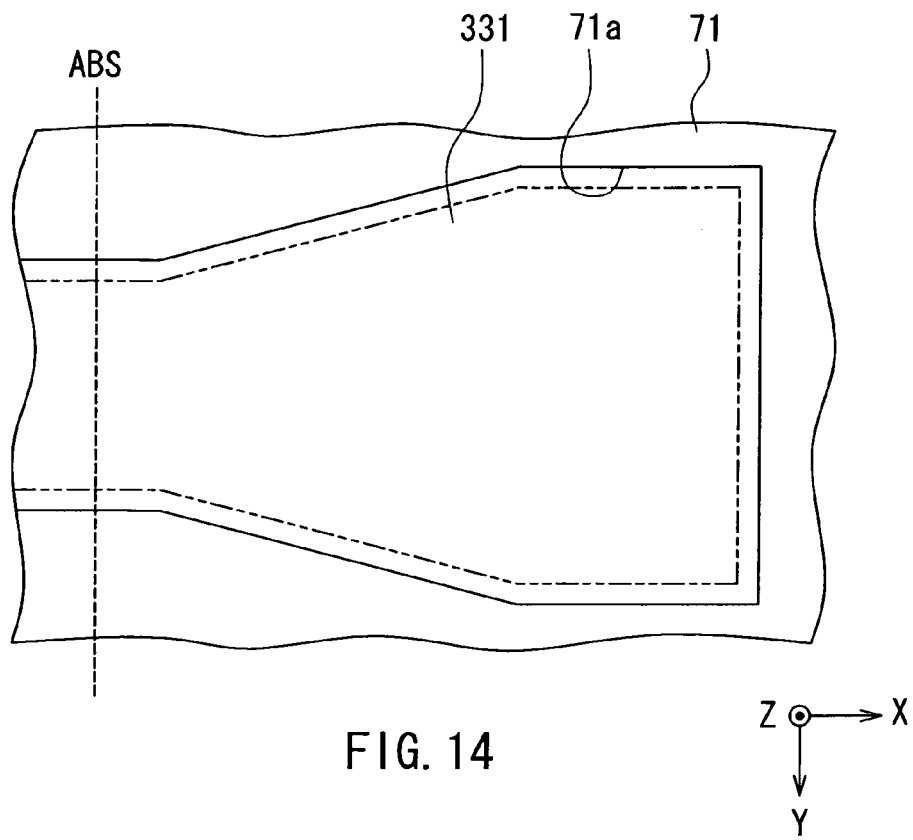
FIG. 14 is a plan view showing a step of a method of forming the plasmon generator of the first embodiment of the invention.
Figure 16:
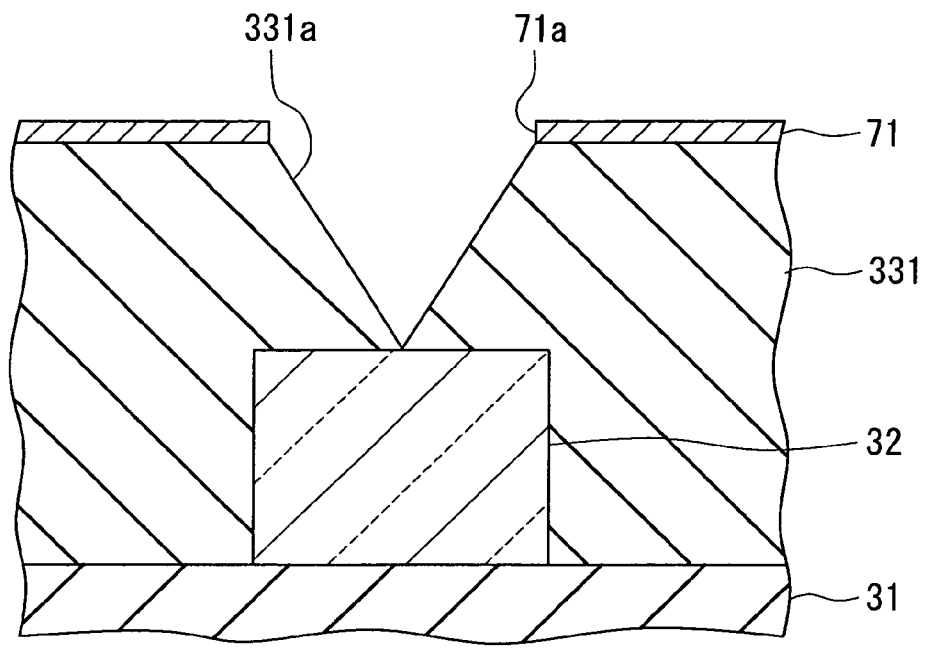
FIG. 16 is a cross-sectional view showing a step that follows the step of FIG. 15.
Figure 17:
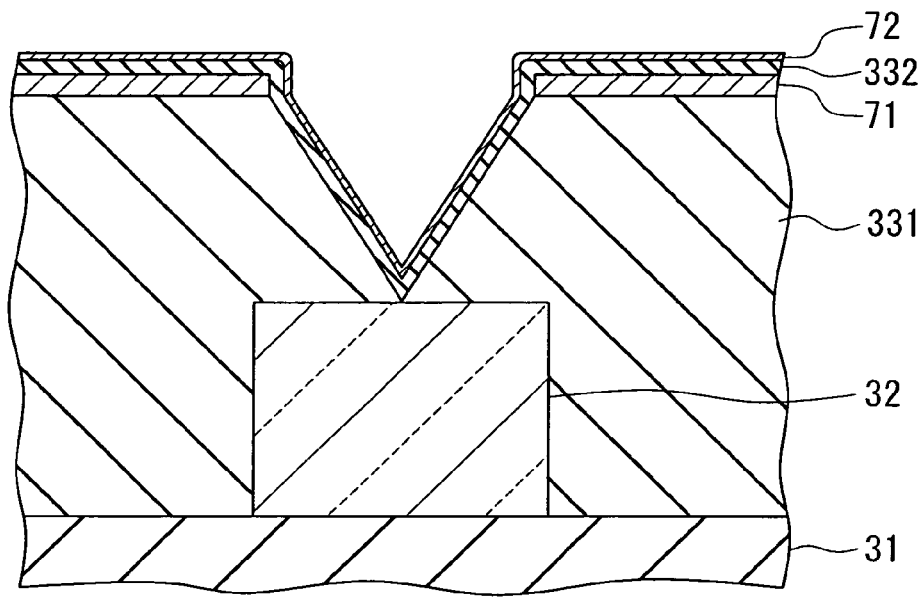
FIG. 17 is a cross-sectional view showing a step that follows the step of FIG. 16.
Figure 18:
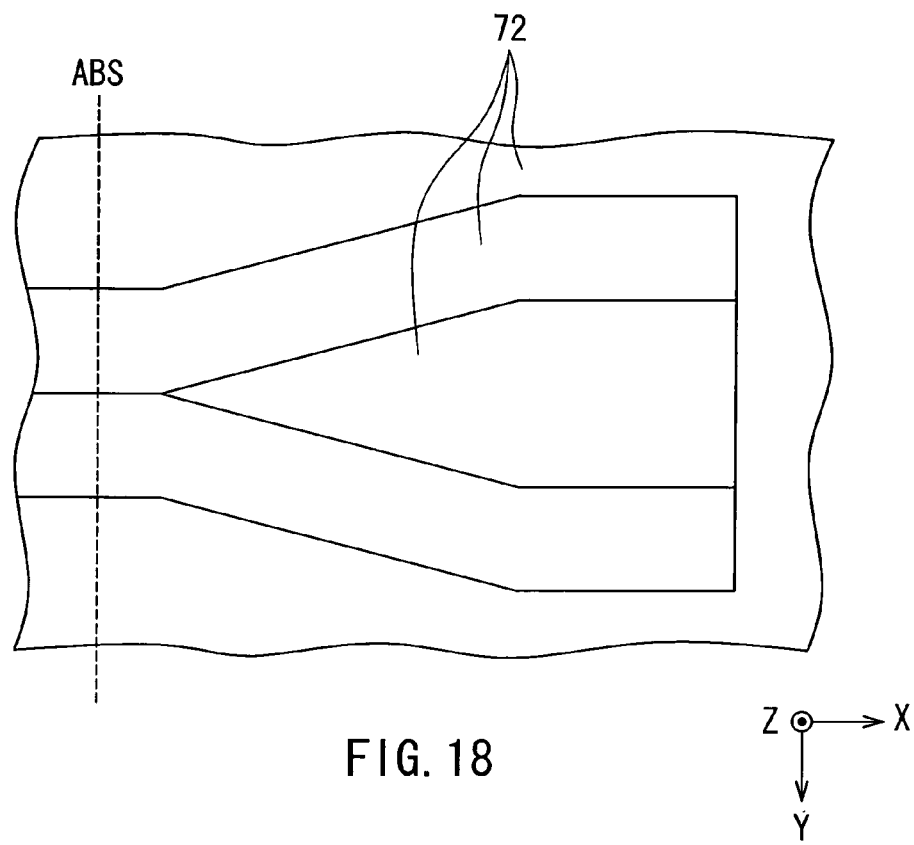
FIG. 18 is a plan view showing the step of FIG. 17.

Reference is now made to FIG. 14 to FIG. 21 to describe an example of the method of forming the plasmon generator 34. FIG. 14 and FIG. 18 are plan views each showing a part of a stack of layers fabricated in the process of forming the plasmon generator 34. FIG. 15 to FIG. 17, FIG. 19, and FIG. 20 are cross-sectional views each showing a stack of layers fabricated in the process of forming the plasmon generator 34. In FIG. 14 and FIG. 18, the symbol ABS indicates the position where the medium facing surface 12a is to be formed. FIG. 15 to FIG. 17, FIG. 19, and FIG. 20 each show a cross section taken at the position ABS.

Figure 15:
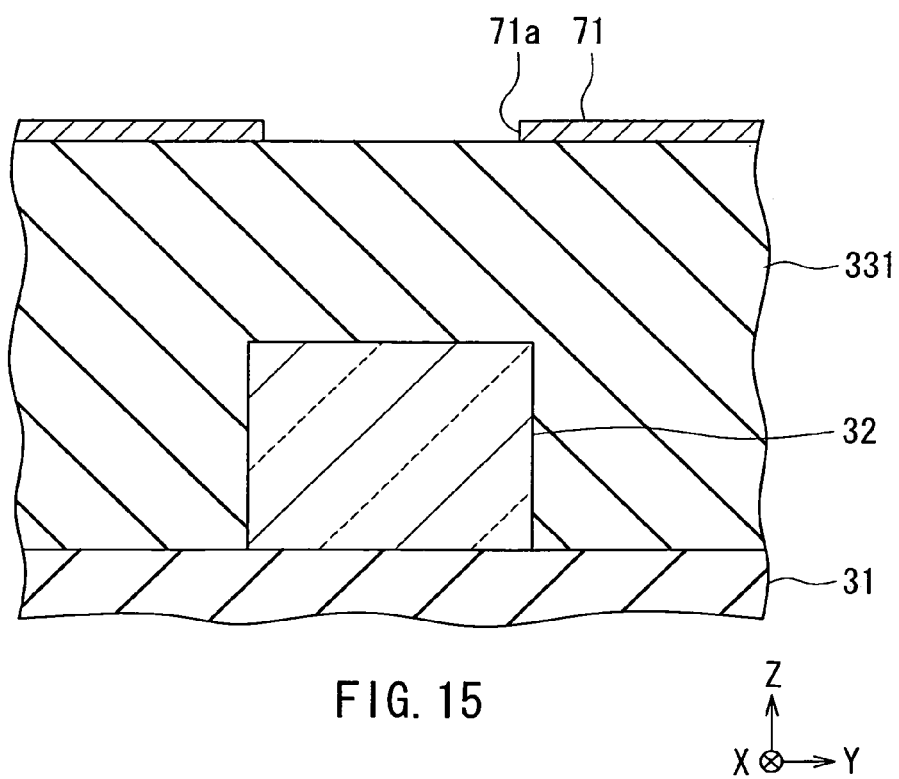
FIG. 15 is a cross-sectional view showing the step of FIG. 14.

FIG. 14 and FIG. 15 show a step of the method of forming the plasmon generator 34. In this step, the waveguide 32 is initially formed on the clad layer 31 and then a dielectric layer 331 is formed to cover the clad layer 31 and the waveguide 32. The dielectric layer 331 is made of the same material as that of the clad layer 33. Next, an etching mask 71 made of, for example, metal, is formed on the dielectric layer 331. The etching mask 71 has an opening 71a that has a size slightly larger than the outer edge (shown by a chain double-dashed line in FIG. 14) of the top end of the plasmon generator 34 to be formed later.

FIG. 16 shows the next step. In this step, the dielectric layer 331 is taper-etched by, for example, reactive ion etching, whereby a groove 331a is formed in the dielectric layer 331. The groove 331a is formed such that its bottom end reaches the top surface of the waveguide 32. The groove 331a is shaped to be slightly larger than the outer shape of the plasmon generator 34 to be formed later.

FIG. 17 and FIG. 18 show the next step. In this step, a dielectric film 332 is initially formed by, for example, sputtering, so as to cover the entire top surface of the stack shown in FIG. 16. The dielectric film 332 is made of the same material as that of the clad layer 33. Next, an adhesion film 72 is formed on the dielectric film 332 by sputtering, for example. The adhesion film 72 is intended for improving the adhesion of the plasmon generator 34 to the clad layer 33. The adhesion film 72 is made of Ti or Ta, for example. The adhesion film 72 has a thickness of 1 nm or so. The dielectric film 332 and the adhesion film 72 are formed also in the groove 331a and the opening 71a. The stack after the formation of the adhesion film 72 has a recess for accommodating the plasmon generator 34 to be formed later.

Figure 19:
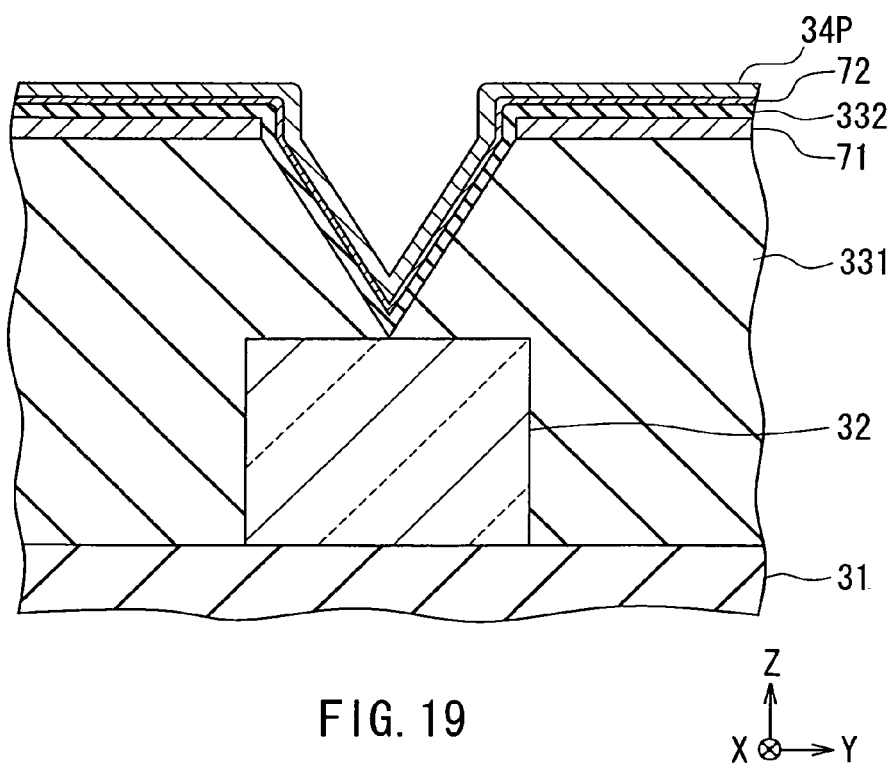
FIG. 19 is a cross-sectional view showing a step that follows the step of FIG. 17.

FIG. 19 shows the next step. In this step, a metal film 34P is formed by, for example, sputtering, so as to cover the entire top surface of the stack shown in FIG. 17. The metal film 34P is to become the plasmon generator 34 later.

Figure 20:
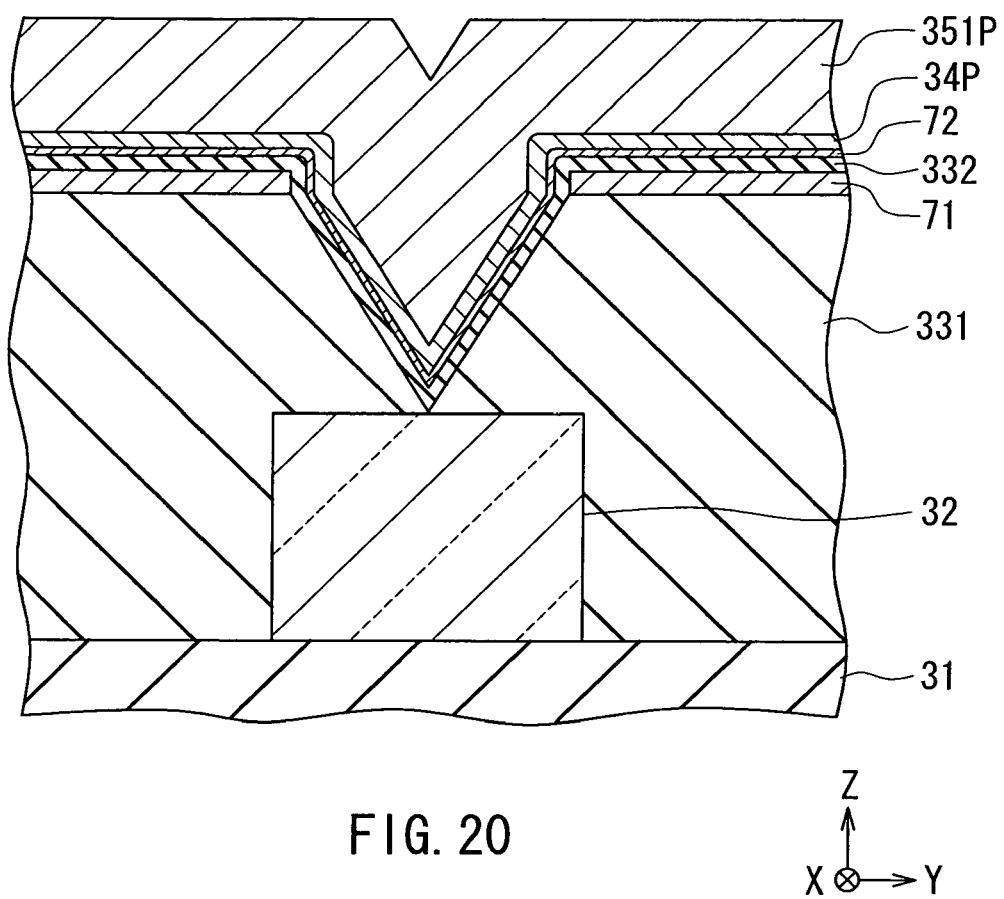
FIG. 20 is a cross-sectional view showing a step that follows the step of FIG. 19.

FIG. 20 shows the next step. In this step, a magnetic layer 351P, which is to become the first layer 351 of the magnetic pole 35 later, is formed on the metal film 34P by plating, for example. The magnetic layer 351P is formed into a thickness sufficient for at least filling the groove 331a.

Figure 21:
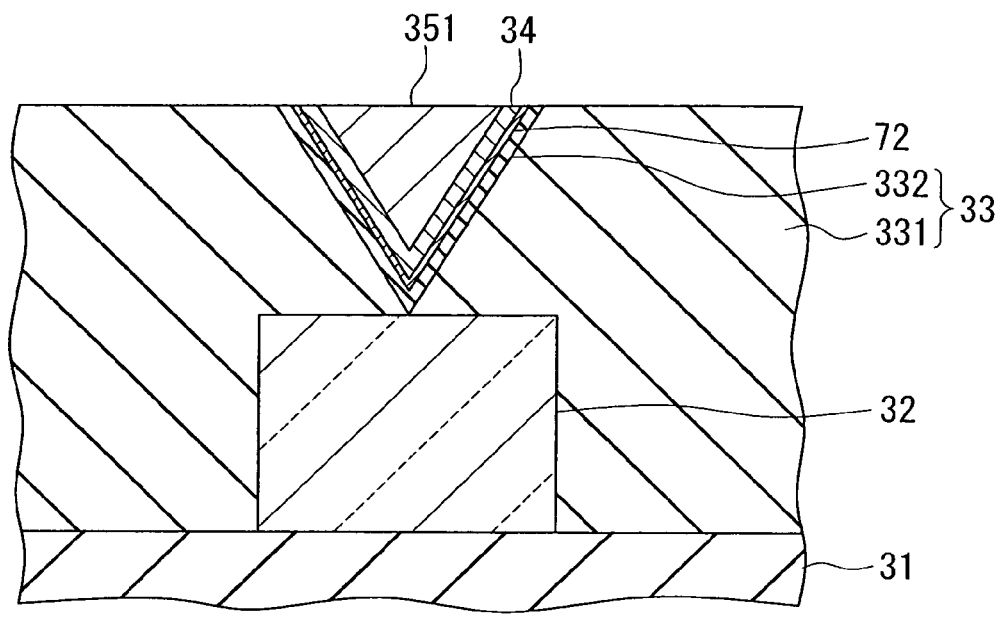
FIG. 21 is a cross-sectional view showing a step that follows the step of FIG. 20.

FIG. 21 shows the next step. In this step, the magnetic layer 351P, the metal film 34P, the adhesion film 72, and the dielectric film 332 are initially polished by, for example, chemical mechanical polishing, until the etching mask 71 is exposed. Next, the magnetic layer 351P, the metal film 34P, the adhesion film 72, the dielectric film 332, and the etching mask 71 are etched by, for example, ion beam etching, until the dielectric layer 331 is exposed. As a result, the remaining dielectric layer 331 and dielectric film 332 constitute the clad layer 33. The dielectric film 332 forms the buffer part 33A. The metal film 34P becomes the plasmon generator 34. The magnetic layer 351P becomes the first layer 351 of the magnetic pole 35.

When the foregoing substructure is completed, the substructure is cut in the vicinities of the positions ABS so that the plurality of pre-slider portions are separated from each other. Subsequently, the surfaces formed by the cutting are polished into the respective medium facing surfaces 12a.

The effects of the heat-assisted magnetic recording head 1 according to the present embodiment will now be described. The plasmon generator 34 of the present embodiment has the outer surface including the surface plasmon exciting surface 341, and has the near-field light generating part 34g located in the medium facing surface 12a. The surface plasmon exciting surface 341 is a flat surface that faces the evanescent light generating surface 32c of the waveguide 32 with a predetermined distance therebetween. Surface plasmons are excited on the surface plasmon exciting surface 341 through coupling with the evanescent light that occurs from the evanescent light generating surface 32c. The near-field light generating part 34g generates near-field light based on the surface plasmons excited on the surface plasmon exciting surface 341.

According to the present embodiment, it is possible to transform the laser light that is propagated through the waveguide 32 into near-field light with higher efficiency, as compared with the conventional technique of irradiating a plasmon antenna directly with laser light to produce near-field light from the plasmon antenna.

In the present embodiment, the surface plasmon exciting surface 341 includes the width changing portion 341a. The width changing portion 341a has a width that decreases with decreasing distance to the medium facing surface 12a, the width being in the direction parallel to the medium facing surface 12a and the evanescent light generating surface 32c (the Y direction). The width changing portion 341a has the two sides 341a1 and 341a2 lying on opposite sides in the direction of the width (the Y direction). As has been described with reference to FIG. 5 and FIG. 7, the electric field intensity of the plasmons including the surface plasmons 46 and the edge plasmons 47 is enhanced in the width changing portion 341a. Consequently, according to the present embodiment, it is possible to efficiently enhance the intensity of the near-field light occurring from the plasmon generator 34.

From the foregoing, according to the present embodiment, it is possible to efficiently use the laser light that is propagated through the waveguide 32, and to generate intense near-field light from the plasmon generator 34. The present embodiment also makes it possible to prevent a part of the medium facing surface 12a from protruding due to transformation of the energy of the laser light into thermal energy in the heat-assisted magnetic recording head.

Now, a description will be given of the result of a simulation showing that the inclusion of the width changing portion 341a in the surface plasmon exciting surface 341 can enhance the intensity of the near-field light occurring from the plasmon generator 34. Initially, a plurality of models used in the simulation will be described. The plurality of models used in the simulation include a plurality of models that included the plasmon generator 34 having the width changing portion 341a, and a model that included a plasmon generator without the width changing portion 341a (hereinafter, referred to as a model of a comparative example). In every model, the material of the waveguide 32 was tantalum oxide, the material of the plasmon generator 34 was Au, the material of each of the clad layers 31 and 33 was alumina, and the material of the magnetic pole 35 was an FeCo alloy. In every model, the waveguide 32 was 0.4 μm both in width $W_{WG}$ and thickness $T_{WG}$ in the vicinity of the plasmon generator 34.

In the plurality of models that included the plasmon generator 34 having the width changing portion 341a, the distance $T_{BF}$ between the surface plasmon exciting surface 341 and the evanescent light generating surface 32c was 50 nm.

The distance D between the tip 342c of the front end face 342 of the plasmon generator 34 and the tip 35c of the end face 35a1 of the first layer 351 of the magnetic pole 35 was 35 nm. The length $H_{NF}$ of the plasmon generator 34 in the X direction was 1.5 μm. The length $H_{NFB}$ of the second portion 34B of the plasmon generator 34 in the X direction was 100 nm. In the plurality of models that included the plasmon generator 34 having the width changing portion 341a, the angle θ shown in FIG. 6 was set to respective different values within the range of 3 to 60 degrees. The width of the width changing portion 341a was increased up to 400 nm with increasing distance from the medium facing surface 12a. The length $H_{NFA}$ of the first portion 34A of the plasmon generator 34 in the X direction therefore varied from one model to another. The length $H_{NFC}$ of the third portion 34C of the plasmon generator 34 in the X direction had a value of $H_{NF}$ minus $H_{NFA}$ and $H_{NFB}$.

The plasmon generator of the model of the comparative example was V-shaped like the second portion 34B along the entire length in the X direction. The length of this plasmon generator in the X direction was 1.5 μm.

For the simulation, a Gaussian beam with a wavelength of 800 nm was selected as the laser light to be propagated through the waveguide 32. Using a three-dimensional finite-difference time-domain method (FDTD method), the near-field light was measured for the electric field intensity in the vicinity of the surface of the magnetic recording medium 201 that was located 8 nm away from the medium facing surface 12a. The electric field intensity of each model was divided by the electric field intensity of a model of the highest electric field intensity to determine the normalized light intensity by definition.

Figure 22:
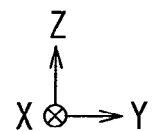
FIG. 22 is a characteristic chart showing the result of a simulation that demonstrates the effect of the heat-assisted magnetic recording head according to the first embodiment of the invention.
Figure 22:
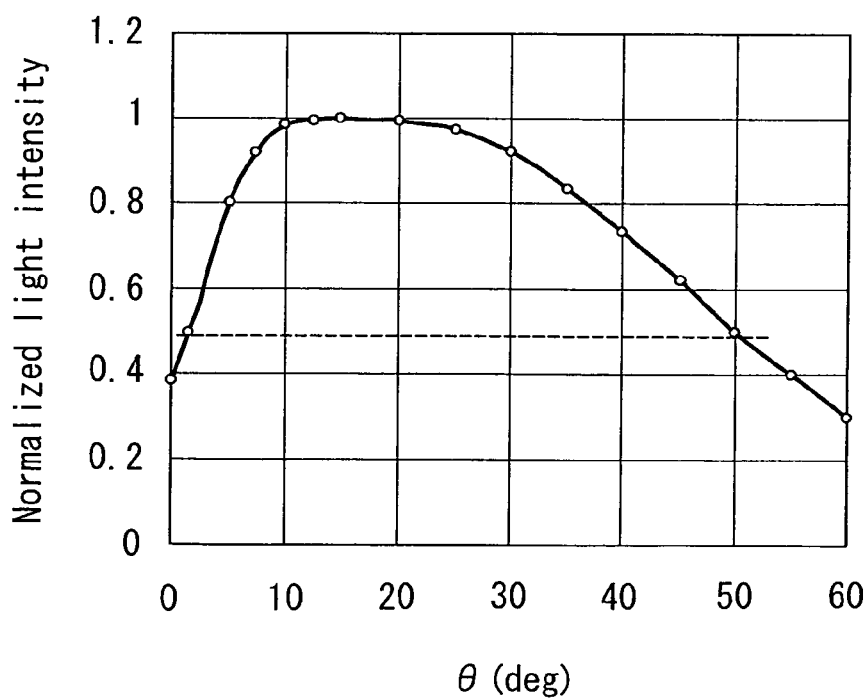

FIG. 22 shows the result of the simulation. In FIG. 22, the horizontal axis shows the angle θ and the vertical axis shows the normalized light intensity. In FIG. 22, θ=0 corresponds to the model of the comparative example. The broken line in FIG. 22 indicates the level of a normalized light intensity 20% higher than the normalized light intensity of the model of the comparative example.

As shown in FIG. 22, normalized light intensities significantly higher than that of the model of the comparative example by 20% or more are obtained when θ is within the range of 3 to 50 degrees. In the present embodiment, θ is therefore defined to be in the range of 3 to 50 degrees. Consequently, according to the present embodiment, the intensity of the near-field light occurring from the plasmon generator 34 can be significantly enhanced by 20% or more as compared with the case of using a plasmon generator that does not include the width changing portion 341a.

As shown in FIG. 22, when θ is within the range of 10 to 25 degrees, the normalized light intensity has a value of 1 or near 1, showing that the near-field light generated from the plasmon generator 34 is particularly high in intensity. In view of this, it is preferred that θ fall within the range of 10 to 25 degrees.

The other effects of the present embodiment will now be described. Initially, a description will be given of the effect resulting from the configuration that the surface plasmon exciting surface 341 of the plasmon generator 34 includes the constant width portion 341b. Suppose that the surface plasmon exciting surface 341 does not include the constant width portion 341b, and the width changing portion 341a extends up to the end of the surface plasmon exciting surface 341 opposite from the medium facing surface 12a. In such a case, the maximum width of the surface plasmon exciting surface 341 is greater as compared with the case where the surface plasmon exciting surface 341 includes the constant width portion 341b. Then, the width $W_{WG}$ of the waveguide 32 in the vicinity of the plasmon generator 34 needs to be increased to the maximum width of the surface plasmon exciting surface 341. Consequently, at least a part of the waveguide 32 in the vicinity of the plasmon generator 34 is likely to enter a multi mode that is capable of propagating a plurality of modes (propagation modes) of light. In this case, the mode that contributes to the excitation of surface plasmons on the surface plasmon exciting surface 341 weakens to decrease the use efficiency of the light that is propagated through the waveguide 32. In contrast, according to the present embodiment, the surface plasmon exciting surface 341 includes the constant width portion 341b, and it is therefore possible to make the width $W_{WG}$ of the waveguide 32 in the vicinity of the plasmon generator 34 smaller than that in the case where the surface plasmon exciting surface 341 does not include the constant width portion 341b. According to the present embodiment, it is therefore possible to bring at least a part of the waveguide 32 in the vicinity of the plasmon generator 34 into a single mode that is capable of propagating only a single mode of light. Consequently, it is possible to improve the use efficiency of the laser light that is propagated through the waveguide 32.

Next, a description will be given of the effect resulting from the configuration that the plasmon generator 34 has the second portion 34B and the edge part 344. As described previously, the medium facing surface 12a is formed by polishing a surface that is formed by cutting the substructure. In such a case, the position of the medium facing surface 12a may slightly vary. Suppose that the plasmon generator 34 is designed not to have the second portion 34B or the edge part 344 so that the ends of the first portion 34A and the width changing portion 341a are located in the medium facing surface 12a. If so, variations in the position of the medium facing surface 12a change the shape of the front end face 342 of the plasmon generator 34, or the shape of the tip 342c in particular. As a result, the near-field light occurring from the plasmon generator 34 can vary in characteristic. In contrast, according to the present embodiment, the plasmon generator 34 has the second portion 34B and the edge part 344. This makes it possible that, even if the position of the medium facing surface 12a somewhat varies, the front end face 342 of the plasmon generator 34 remains unchanged in shape. According to the present embodiment, it is therefore possible to prevent the characteristics of the near-field light generated by the plasmon generator 34 from being changed due to variations in the position of the medium facing surface 12a.

Next, a description will be given of the effect resulting from the configuration that the magnetic pole 35 is disposed such that the plasmon generator 34 is sandwiched between the magnetic pole 35 and the waveguide 32, and the outer surface of the plasmon generator 34 includes the pole contact surface 343. With such a configuration, according to the present embodiment, the end face of the magnetic pole 35 for generating the write magnetic field (the end face 35a1 of the first layer 351) and the near-field light generating part 34g of the plasmon generator 34 for generating the near-field light can be put close to each other in the medium facing surface 12a. This makes it possible to implement an advantageous configuration for heat-assisted magnetic recording. Moreover, according to the present embodiment, the plasmon generator 34 made of a nonmagnetic metal is disposed between the waveguide 32 and the magnetic pole 35. The laser light propagated through the waveguide 32 can thus be prevented from being absorbed by the magnetic pole 35. This can improve the use efficiency of the laser light propagated through the waveguide 32.

In the present embodiment, the magnetic pole 35 is in contact with the plasmon generator 34. The magnetic pole 35 is also in contact with the top yoke layer 43 of high volume. Consequently, according to the present embodiment, the heat occurring from the plasmon generator 34 can be dissipated through the magnetic pole 35 and the top yoke layer 43. This can suppress an excessive rise in temperature of the plasmon generator 34, so that the front end face 342 of the plasmon generator 34 will not protrude from the medium facing surface 12a, nor will the plasmon generator 34 drop in use efficiency of the light. Moreover, according to the present embodiment, the plasmon generator 34 made of a metal is in contact with the magnetic pole 35 made of a magnetic metal material. The plasmon generator 34 is thus not electrically isolated. According to the present embodiment, it is therefore possible to avoid the occurrence of electrical static discharge (ESD) in the plasmon generator 34.

The effect of the shape of the magnetic pole 35 will now be described. In the present embodiment, the front end face 342 of the plasmon generator 34 has the two portions 342a and 342b that are connected to each other into a V-shape. The end face 35a of the magnetic pole 35 located in the medium facing surface 12a includes the end face 35a1 of the first layer 351, which is a triangular portion lying between the two portions 342a and 342b of the front end face 342. The end face 35a1 has the tip 35c located at its bottom end. Of the end face 35a of the magnetic pole 35, the tip 35c is closest to the bottom shield layer 29. Magnetic fluxes therefore concentrate at the vicinity of the tip 35c of the end face 35a of the magnetic pole 35, so that a high write magnetic field occurs from the vicinity of the tip 35c. Consequently, according to the present embodiment, the position where a high write magnetic field occurs in the end face 35a of the magnetic pole 35 can be brought closer to the near-field light generating part 34g of the plasmon generator 34 which generates near-field light.

The plasmon generator 34 has the bottom part 34A1 that is shaped like a plate and faces the evanescent light generating surface 32c, and has the two sidewall parts 34A2 and 34A3 that are each shaped like a plate. The width of the bottom part 34A1 in the direction parallel to the medium facing surface 12a and the evanescent light generating surface 32c (the Y direction) decreases with decreasing distance to the medium facing surface 12a. The distance between the two sidewall parts 34A2 and 34A3 in the direction parallel to the medium facing surface 12a and the evanescent light generating surface 32c (the Y direction) increases with increasing distance from the evanescent light generating surface 32c, and decreases with decreasing distance to the medium facing surface 12a. The magnetic pole 35 includes the first portion 351A that lies between the two sidewall parts 34A2 and 34A3 and is in contact with the bottom part 34A1 and the two sidewall parts 34A2 and 34A3. The width of the first portion 351A in the direction parallel to the medium facing surface 12a and the evanescent light generating surface 32c (the Y direction) decreases with decreasing distance to the medium facing surface 12a. Consequently, according to the present embodiment, magnetic fluxes passing through the magnetic pole 35 can be concentrated as they approach the end face 35a1 of the first layer 351 of the magnetic pole 35. This makes it possible to produce a high write magnetic field from the end face 35a1.

The plasmon generator 34 has the second portion 34B that is V-shaped in cross section parallel to the medium facing surface 12a. The magnetic pole 35 includes the second portion 351B of the first layer 351, which is a triangular-prism-shaped portion accommodated in the second portion 34B. The width of the second portion 351B in the direction parallel to the medium facing surface 12a and the evanescent light generating surface 32c (the Y direction) does not change according to the distance from the medium facing surface 12a. According to the present embodiment, it is therefore possible to keep the shape of the end face 35a1 of the first layer 351 constant even if the position of the medium facing surface 12a somewhat varies. Consequently, according to the present embodiment, it is possible to suppress a change in the write characteristics due to variations in the position of the medium facing surface 12a.

Second Embodiment

Figure 23:
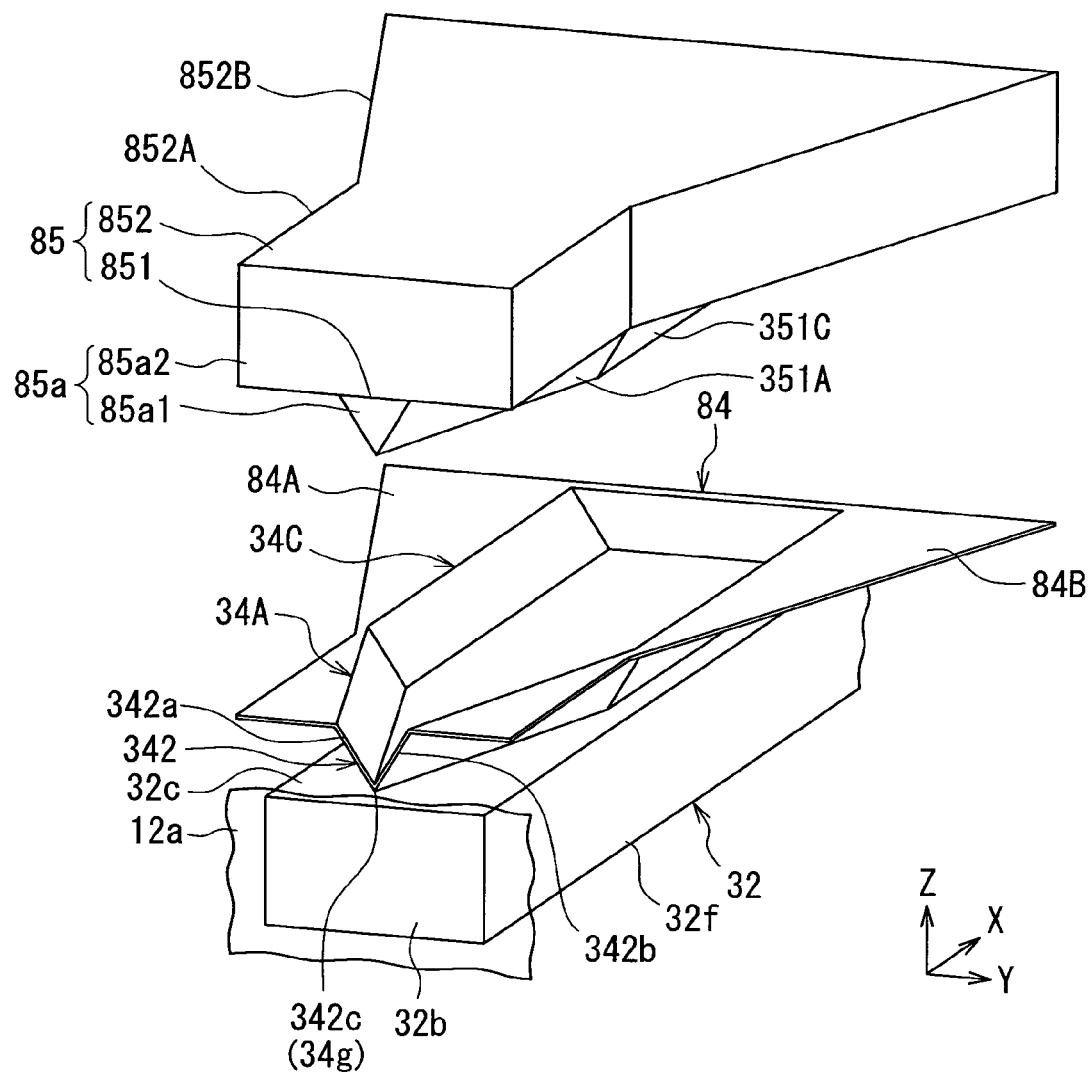
FIG. 23 is a perspective view showing a waveguide, a plasmon generator, and a magnetic pole of a heat-assisted magnetic recording head according to a second embodiment of the invention.

A second embodiment of the present invention will now be described with reference to FIG. 23. FIG. 23 is a perspective view showing the waveguide, the plasmon generator, and the magnetic pole of the heat-assisted magnetic recording head according to the present embodiment. FIG. 23 depicts the plasmon generator and the magnetic pole in a separated state.

The heat-assisted magnetic recording head according to the present embodiment has a plasmon generator 84 instead of the plasmon generator 34 of the first embodiment. The plasmon generator 84 has the first portion 34A and the third portion 34C of the plasmon generator 34, but does not have the second portion 34B. The plasmon generator 84 therefore does not have the edge part 344 of the plasmon generator 34, either. In the plasmon generator 84, the end of the first portion 34A closer to the medium facing surface 12a is located in the medium facing surface 12a and forms the front end face 342. The front end face 342 of the plasmon generator 84 has the same shape as that of the plasmon generator 34.

The heat-assisted magnetic recording head according to the present embodiment has a magnetic pole 85 instead of the magnetic pole 35 of the first embodiment. The magnetic pole 85 includes a first layer 851, and a second layer 852 lying on the first layer 851. The magnetic pole 85 is made of a soft magnetic material, or a magnetic metal material in particular.

The first portion 34A and the third portion 34C of the plasmon generator 84 form inside a space for accommodating the first layer 851 of the magnetic pole 85. The first layer 851 has the first portion 351A and the third portion 351C of the first layer 351 of the magnetic pole 35, but does not have the second portion 351B. In the present embodiment, the end of the first portion 351A closer to the medium facing surface 12a is located in the medium facing surface 12a.

The second layer 852 of the present embodiment has a first portion 852A located on the first portion 351A of the first layer 851, and a second portion 852B located on the third portion 351C of the first layer 851. The first portion 852A has an end face located in the medium facing surface 12a. The second portion 852B is connected to an end of the first portion 852A farther from the medium facing surface 12a.

The width of the first portion 852A in the direction parallel to the medium facing surface 12a and the evanescent light generating surface 32c (the Y direction) is constant regardless of the distance from the medium facing surface 12a, and is greater than the maximum width of the first portion 351A of the first layer 851. The width of the second portion 852B in the direction parallel to the medium facing surface 12a and the evanescent light generating surface 32c (the Y direction) is equal to that of the first portion 852A at the border with the first portion 852A, and increases with increasing distance from the medium facing surface 12a.

The magnetic pole 85 has an end face 85a located in the medium facing surface 12a. The end face 85a includes an end face 85a1 of the first layer 851 located in the medium facing surface 12a and an end face 85a2 of the second layer 852 located in the medium facing surface 12a. The end face 85a1 lies between the two portions 342a and 342b of the front end face 342 of the plasmon generator 84, and has a triangular shape.

The plasmon generator 84 further has two extended portions 84A and 84B that spread out from the top ends of the first portion 34A and the third portion 34C in the direction parallel to the medium facing surface 12a and the evanescent light generating surface 32c (the Y direction). As seen from above, the outer edges of the extended portions 84A and 84B fall on the positions coincident with or close to those of the outer edges of the second layer 852 of the magnetic pole 85. The top surfaces of the extended portions 84A and 84B are in contact with the bottom surface of the second layer 852.

The remainder of configurations of the heat-assisted magnetic recording head, the head gimbal assembly and the magnetic recording device of the present embodiment are the same as those of the first embodiment. The functions and effects of the heat-assisted magnetic recording head according to the present embodiment are the same as in the first embodiment except the functions and effects resulting from the second portion 34B and the edge part 344 of the plasmon generator 34 of the first embodiment and the second portion 351B of the first layer 351 of the magnetic pole 35 of the first embodiment.

The present invention is not limited to the foregoing embodiments, and various modifications may be made thereto. For example, possible shapes of the plasmon generator of the present invention are not limited to the shapes described in the foregoing embodiments. The plasmon generator of the present invention need only have at least a portion that constitutes the width changing portion 341a of the surface plasmon exciting surface 341, i.e., the bottom part 34A1 of the first portion 34A. For example, in the case where the plasmon generator is composed only of the bottom part 34A1 of the first portion 34A, the end of the bottom part 34A1 closer to the medium facing surface 12a is located in the medium facing surface 12a.

The edge part 344 of the plasmon generator 34 of the first embodiment may be replaced with a rectangular flat portion that is small in width and is long in the direction perpendicular to the medium facing surface 12a.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A heat-assisted magnetic recording head comprising:
   a medium facing surface that faces a magnetic recording medium;
   a magnetic pole that has an end face located in the medium facing surface and produces a write magnetic field for writing data on the magnetic recording medium;
   a waveguide that propagates light; and
   a plasmon generator, wherein:
   the waveguide has an evanescent light generating surface that generates evanescent light based on the light propagated through the waveguide;
   the plasmon generator has an outer surface including a surface plasmon exciting surface, and has a near-field light generating part located in the medium facing surface, the surface plasmon exciting surface being a flat surface that faces the evanescent light generating surface with a predetermined distance therebetween;
   a surface plasmon is excited on the surface plasmon exciting surface through coupling with the evanescent light generated from the evanescent light generating surface;
   the near-field light generating part generates near-field light based on the surface plasmon excited on the surface plasmon exciting surface;
   the surface plasmon exciting surface includes a width changing portion, the width changing portion having a width that decreases with decreasing distance to the medium facing surface, the width being in a direction parallel to the medium facing surface and the evanescent light generating surface;
   the width changing portion has two sides that lie on opposite sides in the direction of the width;
   each of the two sides forms an angle in the range of 3 to 50 degrees with respect to a direction perpendicular to the medium facing surface;
   the magnetic pole is located at such a position that the plasmon generator is interposed between the magnetic pole and the waveguide; and
   the outer surface of the plasmon generator further includes a pole contact surface that is in contact with the magnetic pole.

2. The heat-assisted magnetic recording head according to claim 1 wherein:
   the surface plasmon exciting surface further includes a constant width portion, the constant width portion being located farther from the medium facing surface than is the width changing portion, such that the constant width portion is continuous with the width changing portion; and
   the constant width portion has a constant width in the direction parallel to the medium facing surface and the evanescent light generating surface regardless of the distance from the medium facing surface.

3. The heat-assisted magnetic recording head according to claim 1, wherein:
   the width changing portion has a front end part that is formed by the two sides meeting each other, the front end part being located away from the medium facing surface;
   the plasmon generator further has an edge part that connects the front end part of the width changing portion to the near-field light generating part; and
   the edge part propagates an edge plasmon to the near-field light generating part, the edge plasmon being excited based on the surface plasmon that is excited on the surface plasmon exciting surface.

4. The heat-assisted magnetic recording head according to claim 1, wherein each of the two sides of the width changing portion forms an angle in the range of 10 to 25 degrees with respect to the direction perpendicular to the medium facing surface.

5. The heat-assisted magnetic recording head according to claim 1, wherein the outer surface of the plasmon generator further includes a front end face located in the medium facing surface, the front end face including a tip that forms the near-field light generating part.

6. The heat-assisted magnetic recording head according to claim 5, wherein the front end face of the outer surface of the plasmon generator has two portions that are connected to each other into a V-shape, and the end face of the magnetic pole has a triangular portion that lies between the two portions of the front end face.

7. The heat-assisted magnetic recording head according to claim 1, wherein:

the plasmon generator has a bottom part that is shaped like a plate and two sidewall parts that are each shaped like a plate, the bottom part including the width changing portion of the surface plasmon exciting surface, the two sidewall parts being located farther from the evanescent light generating surface than is the bottom part and connected to opposite ends of the bottom part in the direction parallel to the medium facing surface and the evanescent light generating surface;

the bottom part has a width that decreases with decreasing distance to the medium facing surface, the width being in the direction parallel to the medium facing surface and the evanescent light generating surface;

a distance between the two sidewall parts in the direction parallel to the medium facing surface and the evanescent light generating surface increases with increasing distance from the evanescent light generating surface, and decreases with decreasing distance to the medium facing surface; and the magnetic pole includes a portion that lies between the two sidewall parts and is in contact with the bottom part and the two sidewall parts.

8. The heat-assisted magnetic recording head according to claim 7, wherein:

the plasmon generator further has a V-shaped portion that is located between the medium facing surface and each of the bottom part and the two sidewall parts so as to be continuous with the bottom part and the two sidewall parts, the V-shaped portion being V-shaped in cross section parallel to the medium facing surface; and the magnetic pole includes a portion accommodated in the V-shaped portion.

9. The heat-assisted magnetic recording head according to claim 1, further comprising a buffer part that is located between the evanescent light generating surface and the surface plasmon exciting surface and has a refractive index lower than that of the waveguide.

10. A head gimbal assembly comprising: the heat-assisted magnetic recording head according to claim 1; and a suspension that supports the heat-assisted magnetic recording head.

11. A magnetic recording device comprising: a magnetic recording medium; the heat-assisted magnetic recording head according to claim 1; and a positioning device that supports the heat-assisted magnetic recording head and positions the heat-assisted magnetic recording head with respect to the magnetic recording medium.

* * * * *